(12) United States Patent
Murata et al.

(10) Patent No.: US 12,541,288 B2
(45) Date of Patent: Feb. 3, 2026

(54) APPARATUS, SYSTEM, AND METHOD OF CONTROLLING DISPLAY

(71) Applicant: Ricoh Company, Ltd., Tokyo (JP)

(72) Inventors: Jun Murata, Tokyo (JP); Xiaonan Jiang, Kanagawa (JP); Katsuyuki Kaji, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/744,526

(22) Filed: Jun. 14, 2024

(65) Prior Publication Data

US 2024/0338110 A1    Oct. 10, 2024

Related U.S. Application Data

(63) Continuation of application No. 17/694,680, filed on Mar. 15, 2022, now Pat. No. 12,039,152.

(30) Foreign Application Priority Data

Mar. 23, 2021  (JP) ................. 2021-048493
Dec. 28, 2021  (JP) ................. 2021-214832

(51) Int. Cl.
G06F 3/048    (2013.01)
G06F 3/0484   (2022.01)
G06F 3/14     (2006.01)

(52) U.S. Cl.
CPC .............. G06F 3/0484 (2013.01); G06F 3/14 (2013.01)

(58) Field of Classification Search
CPC .......... G06F 3/0484; G06F 3/14; G06Q 40/06
See application file for complete search history.

(56) References Cited

U.S. PATENT DOCUMENTS

| | | |
|---|---|---|
| 8,615,399 B2 | 12/2013 | Birimisa et al. |
| 8,738,516 B1 | 5/2014 | Dean et al. |
| 9,965,808 B1 | 5/2018 | Kunz et al. |
| 10,395,287 B1 | 8/2019 | Lowell et al. |
| 10,872,362 B1 | 12/2020 | Shearer et al. |
| 11,144,990 B1 | 10/2021 | Santa Cruz Masoni et al. |
| 11,250,503 B1 | 2/2022 | Jew et al. |
| 12,106,364 B1* | 10/2024 | Goteti ............... G06Q 40/03 |
| 2003/0182215 A1 | 9/2003 | Ringler et al. |

(Continued)

FOREIGN PATENT DOCUMENTS

| | | |
|---|---|---|
| JP | 2015-204063 A | 11/2015 |
| JP | 2018-180815 A | 11/2018 |
| JP | 2021-033762 A | 3/2021 |

OTHER PUBLICATIONS

Office Action issued Jul. 1, 2025 in Japanese Patent Application No. 2021-214832, 7 pages.

*Primary Examiner* — Mahelet Shiberou
(74) *Attorney, Agent, or Firm* — XSENSUS LLP

(57) ABSTRACT

An apparatus, system, and method, each of which: receives, from a user, condition information indicating a condition for determining a service to be provided to the user; selects, from among a plurality of forms of the user, one or more particular forms that meet the condition for determining a service, as a form to be used for applying the service; and controls a display to display a user interface, the user interface including future projection information of the user after provision of the service based on information on the particular forms.

20 Claims, 25 Drawing Sheets

(56) References Cited

U.S. PATENT DOCUMENTS

| | | | |
|---|---|---|---|
| 2008/0059325 A1* | 3/2008 | Sugahara | G06Q 30/06 705/26.8 |
| 2010/0312691 A1 | 12/2010 | Johnson, Jr. | |
| 2014/0067650 A1* | 3/2014 | Gardiner | G06Q 40/03 705/38 |
| 2015/0127660 A1 | 5/2015 | Zilberberg et al. | |
| 2015/0149333 A1 | 5/2015 | Yaplee et al. | |
| 2021/0272206 A1 | 9/2021 | O'Brien et al. | |

* cited by examiner

FIG. 5

TENANT ID=user0002

TENANT ID=user0001

| EXPENSE TYPE | MONTH | AMOUNT |
|---|---|---|
| SALARY | ... | |
| | 7 | 200,000 |
| | 8 | 200,000 |
| ELECTRICITY | ... | |
| | 7 | 40,000 |
| | 8 | 60,000 |
| RENT | ... | |
| | 7 | 150,000 |
| | 8 | 150,000 |

TENANT ID=user02

TENANT ID=user01

| ID | BILLER | PAYMENT DUE | AMOUNT | PAYMENT STATUS |
|---|---|---|---|---|
| 1201 | N COMPANY | 2020/08/31 | 200,000 | PAID |
| 1201 | M COMPANY | 2020/09/30 | 600,000 | NOT PAID |
| 1202 | N COMPANY | 2020/09/30 | 400,000 | NOT PAID |
| ... | ... | ... | ... | ... |

FIG. 7

TENANT ID=user0002

TENANT ID=user0001

| ID | BUSINESS PARTNER | FINANCING SUBJECT TYPE | PAYMENT DUE | AMOUNT | PAYMENT STATUS | FORM IMAGE STORAGE DESTINATION |
|---|---|---|---|---|---|---|
| 0001 | CORPORATION X8 | ORDER FORM | 2020/08/30 | 100,000 | NOT COLLECTED | ¥root¥imgs¥0001 |
| 0002 | CORPORATION X7 | QUOTATION | 2020/08/30 | 500,000 | NOT COLLECTED | ¥root¥imgs¥0012 |
| 0003 | CORPORATION X2 | INVOICE | 2020/09/31 | 500,000 | NOT COLLECTED | ¥root¥imgs¥0003 |
| 0004 | CORPORATION X4 | INVOICE | 2020/10/31 | 300,000 | NOT COLLECTED | ¥root¥imgs¥0004 |
| 0005 | CORPORATION X2 | INVOICE | 2020/10/31 | 200,000 | NOT COLLECTED | ¥root¥imgs¥0005 |
| 0006 | CORPORATION X4 | INVOICE | 2020/11/30 | 500,000 | NOT COLLECTED | ¥root¥imgs¥0006 |
| 0007 | CORPORATION X7 | INVOICE | 2020/11/30 | 500,000 | NOT COLLECTED | ¥root¥imgs¥0007 |
| 0008 | CORPORATION X8 | INVOICE | 2020/12/31 | 600,000 | NOT COLLECTED | ¥root¥imgs¥0008 |
| 0009 | CORPORATION X9 | INVOICE | 2020/12/31 | 100,000 | NOT COLLECTED | ¥root¥imgs¥0009 |
| 0010 | CORPORATION X4 | INVOICE | 2020/12/31 | 500,000 | NOT COLLECTED | ¥root¥imgs¥0010 |
| ... | ... | ... | ... | ... | ... | ... |

FIG. 8

| | TENANT ID=user0002 | | | |
|---|---|---|---|---|
| TENANT ID=user0001 | | | | |
| BANK NAME | BRANCH NAME | ACCOUNT NUMBER | USER NAME | PASSWORD |
| A BANK | aa BRANCH | 111111 | UserA | ●●●● |
| B BANK | Bb BRANCH | 222222 | UserB | ●●●● |

FIG. 9

| | TENANT ID=user0002 | | |
|---|---|---|---|
| TENANT ID=user0001 | | | |
| CARD NAME | USER NAME | PASSWORD | |
| A CARD | UserAA | ●●●● | |
| B CARD | UserBB | ●●●● | |

FIG. 10

| TENANT ID | NAME | ADDRESS | INDUSTRY TYPE | BUSINESS TYPE |
|---|---|---|---|---|
| user0001 | CORPORATION A | KANAGAWA●●● | CONSTRUCTION | CORPORATE |
| user0002 | CORPORATION B | OSAKA●●● | HEALTH CARE | PRIVATE |
| user0003 | CORPORATION C | TOKYO●●● | NURSING | CORPORATE |
| ... | ... | ... | ... | ... |

FIG. 11

| FINANCING SUBJECT TYPE | FINANCING SERVICE TYPE |
|---|---|
| INVOICE | ACCOUNTS RECEIVABLE FINANCING |
| | FACTORING |
| ORDER FORM | PO FINANCING |
| QUOTATION | QUOTATION FINANCING |

FIG. 12

| FINANCING SERVICE TYPE | FINANCING SERVICE NAME (COMPANY NAME) | NON-APPLICABLE INDUSTRY | COVERAGE AREA | PRIVATE BUSINESS | AMOUNT LIMIT | CONNECTION URL |
|---|---|---|---|---|---|---|
| ACCOUNTS RECEIVABLE FINANCING | SERVICE A1 | NONE | ALL | true | NO LIMIT | https://... |
| | SERVICE A2 | HEALTH CARE, NURSING | ALL | true | 100 million | https://... |
| | ... | | | | | |
| FACTORING | SERVICE B1 | NONE | ALL | true | 10 million | https://... |
| | SERVICE B2 | CONSTRUCTION | WEST JAPAN ONLY | false | 5 million | https://... |
| | ... | | | | | |
| PO FINANCING | SERVICE C1 | NONE | ALL | true | 5 million | https://... |
| | SERVICE C2 | NONE | EAST JAPAN ONLY | true | 20 million | https://... |
| | ... | | | | | |
| QUOTATION FINANCING | SERVICE D1 | NONE | ALL | true | 1 million | https://... |
| | SERVICE D2 | NONE | ALL | true | 0.5 million | https://... |
| ... | | | | | | |

FIG. 13

| TYPE | DESTINATION NAME (COMPANY NAME) | CONNECTION URL |
|---|---|---|
| ACCOUNT INFORMATION | SERVICE J | https://··· |
|  |  |  |
|  |  |  |
| CREDIT CARD | SERVICE K | https://··· |
|  |  |  |
|  |  |  |
| CREDIT INFORMATION | SERVICE H1 | https://··· |
|  | SERVICE H2 | https://··· |
|  | ··· |  |
| ··· |  |  |

FIG. 14

| CREDIBILITY | SERVICE H1 INFORMATION | SERVICE H2 INFORMATION |
|---|---|---|
| 5 | H | 7 |
| 4 | – | 6,5 |
| 3 | N | 4,3 |
| 2 | – | 2 |
| 1 | L | 1 |

FIG. 15

| BUSINESS PARTNER | CREDIBILITY |
|---|---|
| CORPORATION X1 | 5 |
| CORPORATION X2 | 5 |
| CORPORATION X3 | 4 |
| CORPORATION X4 | 5 |
| CORPORATION X5 | 2 |
| CORPORATION X6 | 1 |
| CORPORATION X7 | 1 |
| CORPORATION X8 | 2 |
| CORPORATION X9 | 3 |
| ... | |

FIG. 16

| BUSINESS PARTNER | CREDIBILITY | AMOUNT | FINANCING SUBJECT TYPE | FINANCING SERVICE TYPE | FINANCING SERVICE NAME | SERVICE CHARGE RATE | TRANSFER DATE |
|---|---|---|---|---|---|---|---|
| CORPORATION X1 | 5 | 900,000 | INVOICE | ACCOUNTS RECEIVABLE FINANCING | SERVICE A1 | 10% | NEXT DAY |
| | | | | | SERVICE A2 | 15% | WITHIN 3 DAYS |
| | | | | | ... | ... | ... |
| | | 500,000 | ORDER FORM | FACTORING | SERVICE B1 | 8% | NEXT DAY |
| | | | | | SERVICE B2 | 5% | WITHIN 3 DAYS |
| | | | | | ... | ... | ... |
| | | | | PO FINANCING | SERVICE C1 | 13% | NEXT DAY |
| | | | | | SERVICE C2 | 15% | WITHIN 3 DAYS |
| | | 200,000 | QUOTATION | QUOTATION FINANCING | SERVICE D1 | 20% | NEXT DAY |
| | | | | | SERVICE D2 | 25% | WITHIN 3 DAYS |
| | | | | | ... | ... | ... |
| CORPORATION X2 | 5 | 500,000 (ALL SEPARATE PROJECTS) | INVOICE | ACCOUNTS RECEIVABLE FINANCING | SERVICE A1 | 10% | NEXT DAY |
| | | | | | SERVICE A2 | 15% | WITHIN 3 DAYS |
| | | | | | ... | ... | ... |
| | | | | FACTORING | SERVICE B1 | 6% | NEXT DAY |
| | | | | | SERVICE B2 | 8% | WITHIN 3 DAYS |
| | | | | | ... | ... | ... |
| | | 500,000 | ORDER FORM | PO FINANCING | SERVICE C1 | 13% | NEXT DAY |
| | | | | | SERVICE C2 | 15% | WITHIN 3 DAYS |
| CORPORATION X3 | 3 | 800,000 | INVOICE | ACCOUNTS RECEIVABLE FINANCING | SERVICE A1 | 10% | NEXT DAY |
| | | | | | SERVICE A2 | 15% | WITHIN 3 DAYS |
| | | | | FACTORING | SERVICE B1 | 10% | NEXT DAY |
| | | | | | SERVICE B2 | 7% | WITHIN 3 DAYS |
| | | | | | ... | ... | ... |
| ... | | | | | | | |

RECOMMENDATION SCREEN (SERVICE CHARGE RATE) — 250

| BUSINESS PARTNER | FINANCING SUBJECT TYPE | AMOUNT | PAYMENT DUE | FINANCING TYPE | FINANCIAL SOURCE | SERVICE CHARGE RATE | AMOUNT FINANCED | PAYMENT DATE | CREDI-BILITY |
|---|---|---|---|---|---|---|---|---|---|
| ☑ CORPORATION X1 | INVOICE | 900,000 | 2020/01/31 | FACTORING | B2 COMPANY | 5% | 855,000 | 2020/09/19 | 5 |
| ☑ CORPORATION X2 | INVOICE | 500,000 | 2020/02/29 | FACTORING | B1 COMPANY | 6% | 470,000 | 2020/09/16 | 5 |
| ☑ CORPORATION X3 | INVOICE | 800,000 | 2020/02/29 | FACTORING | B2 COMPANY | 7% | 744,000 | 2020/09/19 | 4 |

TOTAL AMOUNT FINANCED: 2,069,000
SHORTAGE: 2,000,000

[SHOW GRAPH] — 256  [CONFIRM] — 257  [SHOW OTHER RECOMMENDATION] — 258

FIG. 27

RECOMMENDATION SCREEN (SERVICE CHARGE RATE) — 251

| | BUSINESS PARTNER | FINANCING SUBJECT TYPE | AMOUNT | PAYMENT DUE | FINANCING TYPE | FINANCIAL SOURCE | SERVICE CHARGE RATE | AMOUNT FINANCED | PAYMENT DATE | CREDI-BILITY |
|---|---|---|---|---|---|---|---|---|---|---|
| ☑ | CORPORATION X1 | INVOICE | 900,000 | 2020/01/31 | FACTORING | B2 COMPANY | 5% | 855,000 | 2019/09/19 | 5 |
| ☑ | CORPORATION X2 | INVOICE | 500,000 | 2020/02/29 | FACTORING | B1 COMPANY | 6% | 470,000 | 2020/09/16 | 5 |
| ☑ | CORPORATION X3 | INVOICE | 800,000 | 2020/02/29 | FACTORING | B2 COMPANY | 7% | 744,000 | 2019/09/19 | 4 |
| ☐ | CORPORATION X4 | INVOICE | 500,000 | 2019/12/31 | FACTORING | B2 COMPANY | 8% | 460,000 | 2019/09/19 | 5 |
| ☐ | CORPORATION X4 | INVOICE | 300,000 | 2020/03/31 | FACTORING | B2 COMPANY | 10% | 270,000 | 2019/09/19 | 5 |

TOTAL AMOUNT FINANCED: 2,069,000
SHORTAGE: 2,000,000

[SHOW GRAPH] — 256    [CONFIRM] — 257    [SHOW OTHER RECOMMENDATION] — 259

FIG. 28

RECOMMENDATION SCREEN (SERVICE CHARGE RATE) — 252

| | BUSINESS PARTNER | FINANCING SUBJECT TYPE | AMOUNT | PAYMENT DUE | FINANCING TYPE | FINANCIAL SOURCE | SERVICE CHARGE RATE | AMOUNT FINANCED | PAYMENT DATE | CREDI-BILITY |
|---|---|---|---|---|---|---|---|---|---|---|
| ☑ | CORPORATION X1 | INVOICE | 900,000 | 2020/01/31 | FACTORING | B2 COMPANY | 5% | 855,000 | 2019/09/19 | 5 |
| ☑ | CORPORATION X2 | INVOICE | 500,000 | 2020/02/29 | FACTORING | B1 COMPANY | 6% | 470,000 | 2020/09/16 | 5 |
| ☐ | CORPORATION X3 | INVOICE | 800,000 | 2020/02/29 | FACTORING | B2 COMPANY | 7% | 744,000 | 2019/09/19 | 4 |
| ☑ | CORPORATION X4 | INVOICE | 500,000 | 2019/12/31 | FACTORING | B2 COMPANY | 8% | 460,000 | 2019/09/19 | 5 |
| ☑ | CORPORATION X4 | INVOICE | 300,000 | 2020/03/31 | FACTORING | B2 COMPANY | 10% | 270,000 | 2019/09/19 | 5 |

TOTAL AMOUNT FINANCED: 2,055,000
SHORTAGE: 2,000,000

[SHOW GRAPH] — 256   [CONFIRM] — 257   [SHOW OTHER RECOMMENDATION] — 259

APPARATUS, SYSTEM, AND METHOD OF CONTROLLING DISPLAY

CROSS-REFERENCE TO RELATED APPLICATIONS

This patent application is a Continuation Application of U.S. application Ser. No. 17/694,680, filed on Mar. 15, 2022, which is based on and claims priority pursuant to 35 U.S.C. § 119 (a) to Japanese Patent Application Nos. 2021-048493, filed on Mar. 23, 2021, and 2021-214832, filed on Dec. 28, 2021, in the Japan Patent Office, the entire disclosure of each is hereby incorporated by reference herein.

BACKGROUND

Technical Field

The present disclosure relates to an apparatus, system, and method of controlling display.

Related Art

For example, there is a computer system for assisting a user to select a service. However, the user is often difficult to make a right decision, as the user cannot see predicted outcome after the user is provided with such service.

SUMMARY

Example embodiments include an apparatus for controlling display, including circuitry that receives, from a user, condition information indicating a condition for determining a service to be provided to the user. The circuitry selects, from among a plurality of forms of the user, one or more particular forms that meet the condition for determining a service, as a form to be used for applying the service. The circuitry controls a display to display a user interface, the user interface including future projection information of the user after provision of the service based on information on the particular forms.

Example embodiments include a system for controlling display, including a memory that stores information on a plurality of forms of a user, and circuitry. The circuitry receives, from the user, condition information indicating a condition for determining a service to be provided to the user. The circuitry selects, from among the plurality of forms of the user, one or more particular forms that meet the condition for determining a service, as a form to be used for applying the service. The circuitry displays a user interface including future projection information of the user after provision of the service based on information on the particular forms.

Example embodiments include a method of controlling display, including: receiving, from a user, condition information indicating a condition for determining a service to be provided to the user; selecting, from among a plurality of forms of the user, one or more particular forms that meet the condition for determining a service, as a form to be used for applying the service; and controlling a display to display a user interface, the user interface including future projection information of the user after provision of the service based on information on the particular forms.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is a conceptual diagram illustrating an example of tenant periodic expense management table;

FIG. 6 is a conceptual diagram illustrating an example of tenant-specific payment management table;

FIG. 7 is a conceptual diagram illustrating an example of financing information management table;

FIG. 8 is a conceptual diagram illustrating an example of tenant bank account management table;

FIG. 9 is a conceptual diagram illustrating an example of tenant credit card management table;

FIG. 10 is a conceptual diagram illustrating an example of tenant management table;

FIG. 11 is a conceptual diagram illustrating an example of financing service type management table;

FIG. 12 is a conceptual diagram illustrating an example of financing service management table;

FIG. 13 is a conceptual diagram illustrating an example of destination information management table;

FIG. 14 is a conceptual diagram illustrating an example of credit information adjustment management table;

FIG. 15 is a conceptual diagram illustrating an example of credit information management table;

FIG. 16 is a conceptual diagram illustrating an example of recommendation candidate information management table;

FIG. 19 is an illustration of an example cash budget screen;

FIG. 25 is an illustration of a display example of the cash budget screen reflecting the recommendation information in the case of selecting the service charge rate priority;

FIG. 26 is an illustration of a display example of the recommendation screen in the case of selecting the service charge rate priority;

FIG. 27 is an illustration of a display example of the recommendation screen, which is updated, in the case of selecting the service charge rate priority;

FIG. 28 is an illustration of a display example of the recommendation screen after recommendation information is changed in the case of selecting the service charge rate priority.

Figure 1:
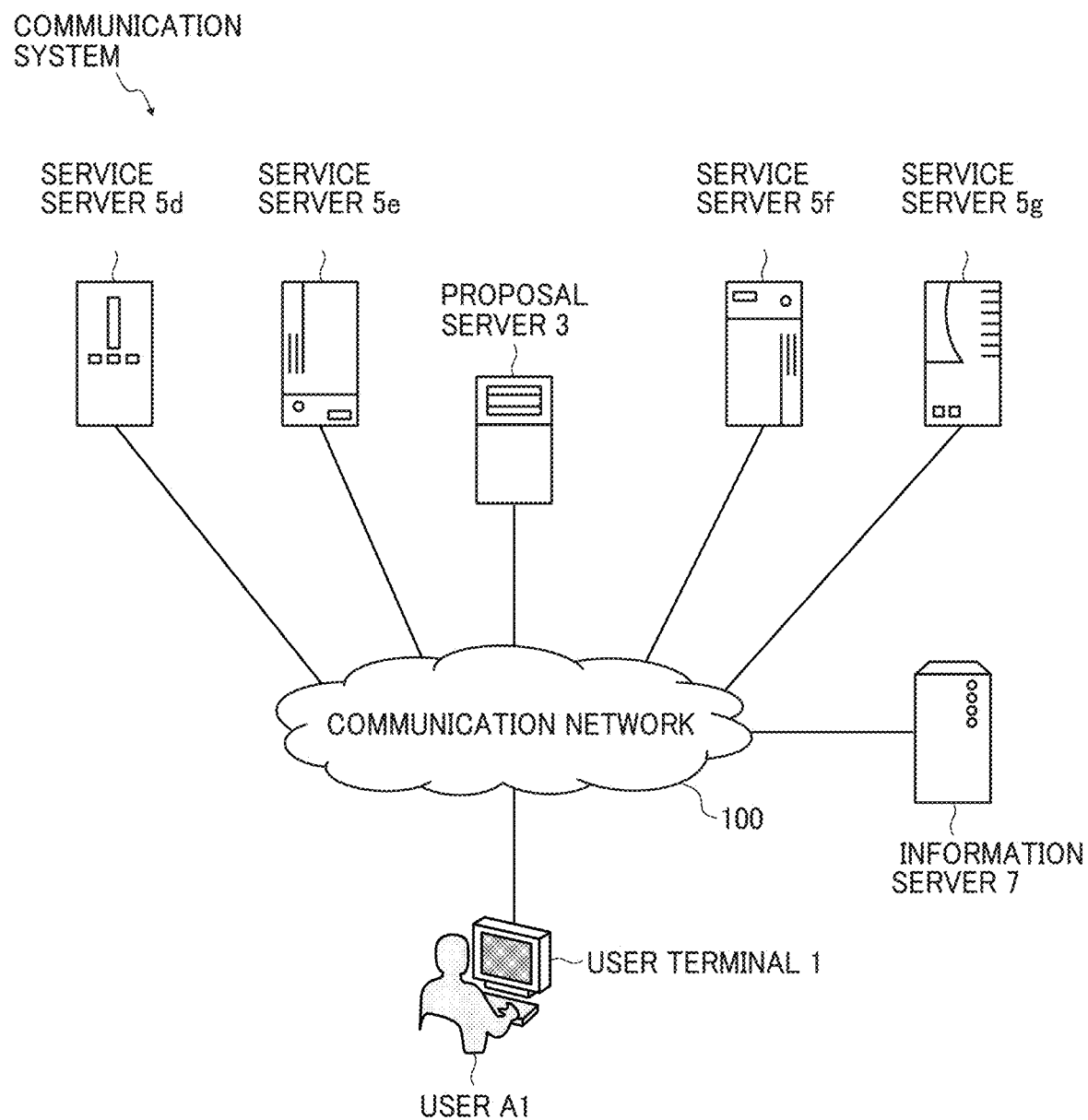
FIG. 1 is a schematic diagram illustrating a configuration of a communication system according to the embodiments.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Overview of Communication System

Figure 3:
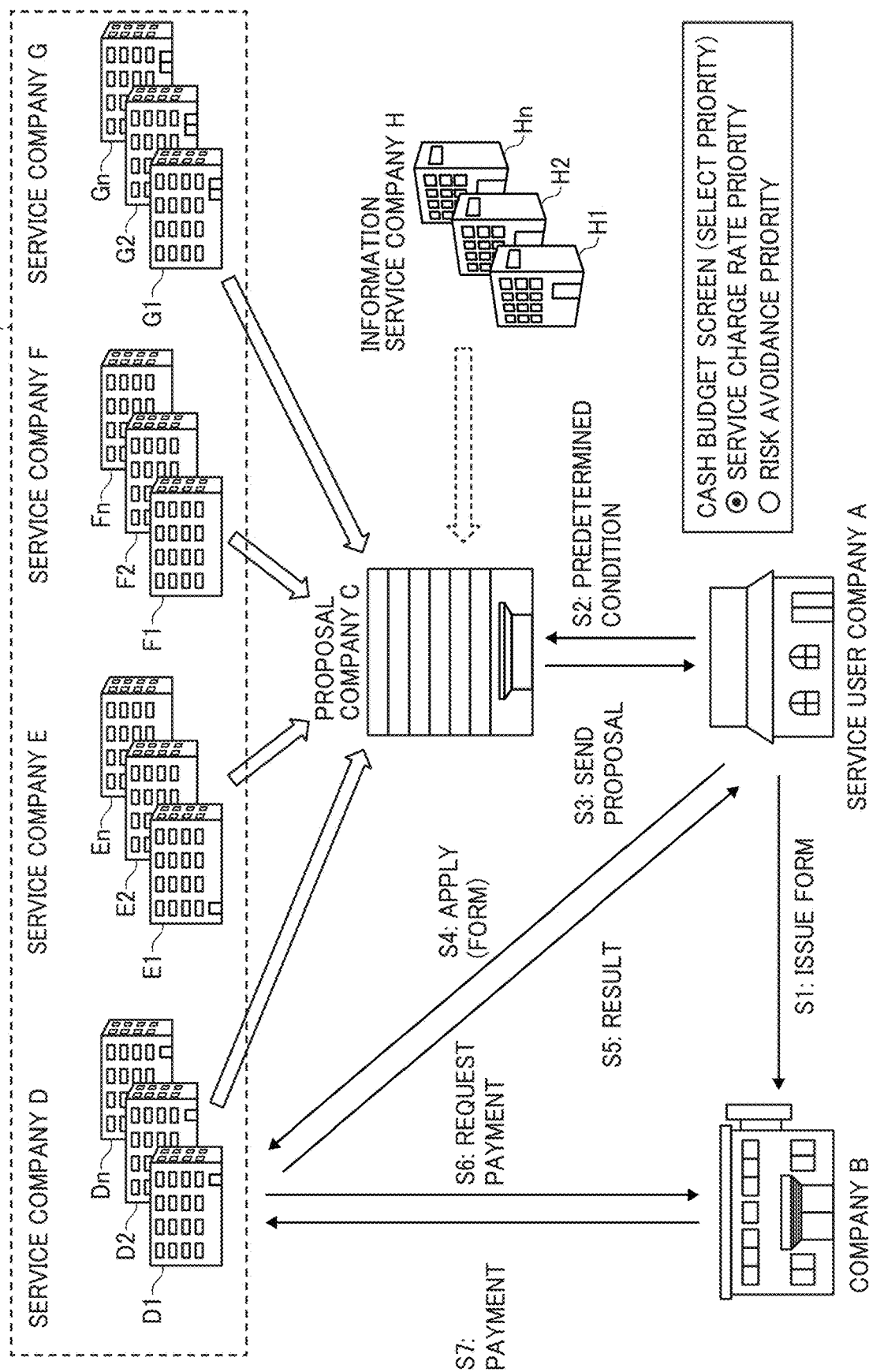
FIG. 3 is a diagram illustrating relationships between companies, as entities implementing the communication system, according to the embodiments.

FIG. 1 is a schematic diagram illustrating a configuration of a communication system according to the embodiments. Specifically, FIG. 1 is a diagram illustrating a terminal or a server provided at each entity, for example, at each company as illustrated in FIG. 3.

The communication system of FIG. 1 includes a user terminal 1 operated by a user A1, a proposal server 3, an information server 7, and a plurality of service servers 5d to 5g, which are connected through a communication network 100.

In one embodiment, the proposal server 3 receives, from the user terminal 1, condition information indicating a condition for determining a service to be provided to the user A1. The proposal server 3 can access information on a plurality of forms indicating activities of the user A1, and select one or more particular forms that meet the condition requested by the user A1. Based on the information on the particular forms, the proposal server 3 generates a user interface for display at the user terminal 1, which includes future projection information of the user A1, after the service is provided to the user.

The user interface has a function of outputting and a function of inputting, as describe below in some examples. However, in some other examples, the user interface does not have to be provided with a section that receives a user input, such that the user interface may only have a function to output, depending on display content.

Hardware Configuration of Communication System

Next, referring to FIG. 2, hardware configurations of terminal and servers in the communication system illustrated in FIG. 1 will be described according to the embodiments. Since all of the terminal and the servers have the same hardware configuration, the hardware configuration of the user terminal I will be described as an example, and the description of the hardware configuration of each server is omitted.

Figure 2:
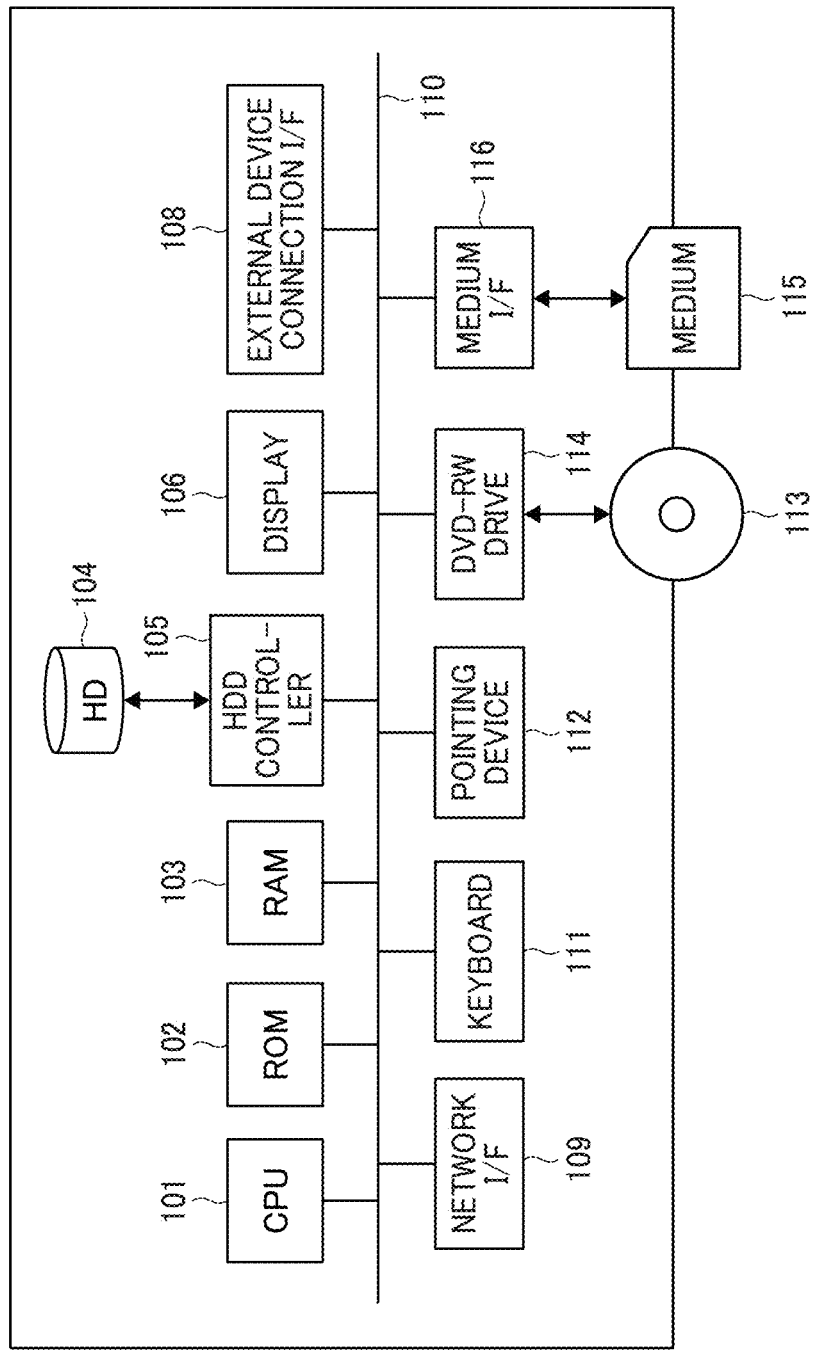
FIG. 2 is a schematic diagram illustrating a hardware configuration of a terminal or a server in the communication system of FIG. 1 according to the embodiments.

As illustrated in FIG. 2, the user terminal 1, which is implemented by a computer, includes a central processing unit (CPU) 101, a read only memory (ROM) 102, a random access memory (RAM) 103, a hard disk (HD) 104, a Hard Disk Drive (HDD) controller 105, a display 106, an external device connection interface (I/F) 108, a network I/F 109, a bus line 110, a keyboard 111, a pointing device 112, a Digital Versatile Disk Rewritable (DVD-RW) drive 114, and a medium I/F 116.

Among them, the CPU 101 controls entire operation of the computer. The ROM 102 stores a program for executing the CPU 101 such as an initial program loader (IPL). The RAM 103 is used as a work area for the CPU 101. The HD 104 stores various data such as a control program. The HDD controller 105 controls reading or writing of various data from or to the HD 104 under control of the CPU 101. The display 106 displays various information such as a cursor, menu, window, character, and image. The external device connection I/F 108 is an interface for connecting the computer to various external devices. Examples of the external devices include, but not limited to, a universal serial bus (USB) memory and a printer. The network I/F 109 is an interface that controls communication of data with an external device through the communication network 100. The bus line 110 is, for example, an address bus or a data bus, which electrically connects the elements such as the CPU 101 illustrated in FIG. 2.

The keyboard 111 is one example of an input device provided with a plurality of keys for allowing a user to input characters, numerals, or various instructions. The pointing device 112 is an example of an input device that allows a user to select or execute a specific instruction, select a target for processing, or move a cursor being displayed. The DVD-RW drive 114 controls reading and writing of various data from and to a DVD-RW 113, which is an example of a removable recording medium. In alternative to the DVD-RW, any recording medium may be used such as a DVD-R, Blu-ray Disc (Registered Trademark), etc. The medium I/F 116 controls reading and writing (storing) of data from and to a recording medium 115 such as a flash memory.

The external device connection I/F 108 may be connected to a microphone as an example of a sound collecting device, a speaker as an example of a sound output device, a camera as an example of an imaging device, etc.

In the following embodiments, the example case in which the proposal server 3 proposes a financing service, as a particular service, to the user A1 is described.

Relationships Between Companies

Referring to FIG. 3, the relationships between companies, which are examples of entities, will be described according to embodiments. FIG. 3 is a diagram illustrating relationships between companies according to the embodiments. The companies include a service user company A, a business partner company B, a proposal company C, a factoring service company D, an accounts receivable financing service company E, a Purchase Order (PO) financing service company F, and an estimate/quotation (quotation) financing service company G.

As illustrated in FIG. 3, the service user company A is a company that uses a service provided by the proposal company C, which recommends a financing source. The business partner company B is a business partner of the service user company A. In this example, the service user company A is a creditor and the business partner company B is a debtor. For example, the business partner company B may be a customer of the service user company A. The proposal company C is a company that provides the service for proposing a financing source to the service user company A.

The factoring service company D, the accounts receivable financing service company E, the PO financing service company F, and the quotation financing service company G are all examples of a financing service company that provides finance (funds), which are examples of a service company. Specifically, the factoring service company D is a company that provides a factoring service, in which a business sells its accounts receivable to a third party at a discount. The accounts receivable financing service company E is a company that provides an accounts receivable financing service, which allows a business to receive early payment on outstanding invoices. The PO financing service company F is a company that provides a PO financing service, which allows a business to receive funding for a pre-ordered project using the purchase order. The quotation financing service company G is a company that provides a quotation financing service, which allows a business to receive funding for estimate or quotation. The financing service company is a financing source for the service user company A.

The factoring service company D is a general term used to collectively refer to a plurality of factoring service companies D1, D2, . . . . Dn. The accounts receivable financing service company E is a general term used to collectively refer to a plurality of accounts receivable financing service companies E1, E2, . . . . En. The PO financing service company F is a general term used to collectively refer to a plurality of PO financing service companies F1, F2, . . . . Fn. The quotation financing service company G is a general term used to collectively refer to a plurality of quotation financing service companies G1, G2, . . . . Gn. The credit information service company H is a company that provides credit information to the proposal company C. The credit information service company H has credit information of companies, such as business partner companies, for evaluating credibility of the company. The credit information service company H is a general term used to collectively refer to a plurality of credit information service companies H1, H2, . . . . Hn.

The following describes an outline of transactions, performed by the entities of FIG. 3, according to the embodiments.

First, the service user company A provides or plans to provide products or services to the business partner company B, such that accounts receivable occurs (S1). Then, the service user company A notifies the proposal company C of condition information indicating a predetermined condition (service charge rate priority, risk avoidance priority) desired by the service user company A, to request proposal of a financing source that meets the condition of the service user company A from among a plurality of financing sources (S2). The proposal company C acquires the credit information of the business partner company B from the credit information service company H, and proposes a particular financing source to the service user company A based on comprehensive determination of various information such as the credit information that is obtained, the contents of forms, and the predetermined condition from the service user company A (S3).

The service user company A sends a form to the proposed financing source (financing service company) to apply for financing (S4). In response to reception of the form, the particular financing service company provides financing to the service user company A, assuming that the user company A has passed the audit (S5). The particular financing service company charges the business partner company B for amount indicated by the accounts receivable (S6). The business partner company B pays the amount indicated by the accounts receivable to the particular financing service company on the due date (S7).

Referring back to FIG. 1, the example case in which the communication system of FIG. 1 is implemented by the example case of FIG. 3 is described.

The service user company A is provided with the user terminal 1 such as a personal computer (PC), which is operated by the user A1. The proposal company C is provided with the proposal server 3. The factoring service company D, the accounts receivable financing service company E, the PO financing service company F, and the quotation financing service company G are respectively provided with the service servers 5d, 5e, 5f, and 5g, such as the financing service servers 5d, 5e, 5f, and 5g. The credit information service company H is provided with the information server 7, such as a credit information server 7. Each server is implemented by one or more computers. The user terminal 1, the financing service servers 5d, 5e, 5f, and 5g, and the credit information server 7 are communicable with one another via a communication network 100 such as the Internet. Hereinafter, the financing service servers 5d, 5e, 5f, and 5g are collectively referred to as "financing service server 5".

Functional Configuration of Communication System

Figure 4:
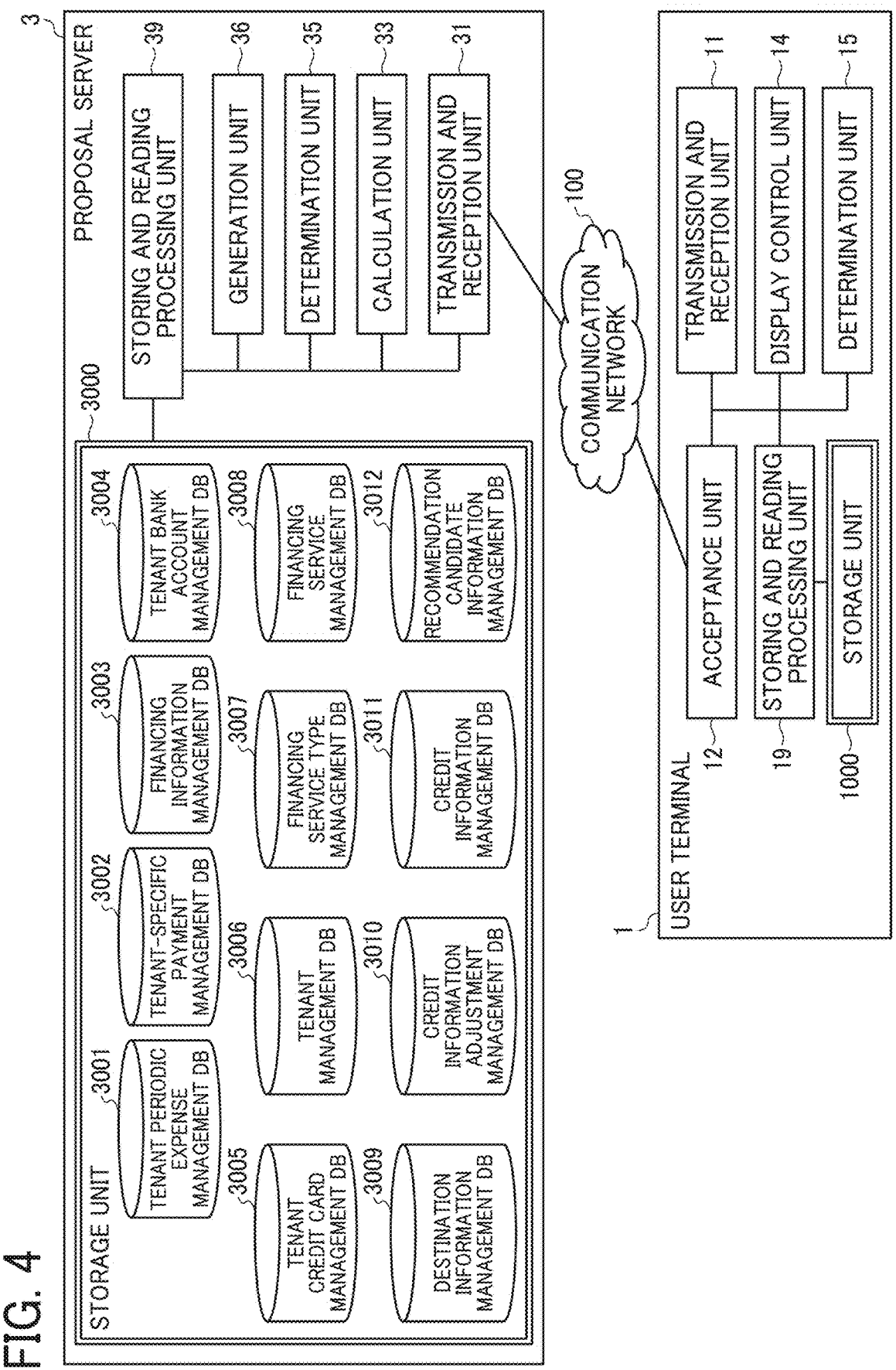
FIG. 4 is a block diagram illustrating a functional configuration of the communication system of FIG. 1 according to the embodiment.

Next, referring to FIGS. 2 to 16, a functional configuration of the communication system is described according to the embodiments. FIG. 4 is a block diagram illustrating a functional configuration of the communication system of FIG. 1 according to the embodiment. Since the financing service server 5 and the credit information server 7 are each implemented by a general-purpose computer, at least in the following processing, description thereof will be omitted.

Functional Configuration of User Terminal

Referring to FIGS. 2 and 4, a functional configuration of the user terminal 1 is described according to the embodiment. As illustrated in FIG. 4, the user terminal 1 includes a transmission and reception unit 11, an acceptance unit 12, a display control unit 14, a determination unit 15, and a storing and reading processing unit 19. These units are functions implemented by or caused to function by operating any of the hardware elements illustrated in FIG. 2 in cooperation with the instructions of the CPU 101 according to the control program expanded from the HD 104 to the RAM 103. The user terminal 1 further includes a storage unit 1000 implemented by the RAM 103 and the HD 104 illustrated in FIG. 2.

Functional Units of User Terminal

Next, functional units of the user terminal 1 will be described. The transmission and reception unit 11, which is implemented by instructions of the CPU 101, the external device connection I/F 108, and the network I/F 109 illustrated in FIG. 2, transmits or receives various types of data (or information) to or from other terminal, device, apparatus, or system through the communication network 100.

The acceptance unit 12, which is mainly implemented by the instructions from the CPU 101, the keyboard 111 and the pointing device 112, illustrated in FIG. 2, receives various inputs from the user.

The display control unit 14, which is mainly implemented by instructions from the CPU 101 illustrated in FIG. 2, outputs image data to the display 106 or an external display connected to the external device connection I/F 108 to cause an image be displayed. The display control unit 14 has a web browser function.

The determination unit 15, which is implemented by instructions of the CPU 101 illustrated in FIG. 2, has a function of making various determinations.

The storing and reading processing unit 19, which is mainly implemented by instructions from the CPU 101 and the HDD controller 105 illustrated in FIG. 2, performs processing of storing various types of information in the storage unit 1000 and reading various types of information stored in the storage unit 1000.

Functional Configuration of Proposal Server

Next, referring to FIGS. 2 to 16, a functional configuration of the proposal server 3 is described according to the embodiment. As illustrated in FIG. 4, the proposal server 3 includes a transmission and reception unit 31, a calculation unit 33, a determination unit 35, a generation unit 36, and a storing and reading processing unit 39. These units are functions implemented by or caused to function by operating any of the hardware elements illustrated in FIG. 2 in cooperation with the instructions of the CPU 101 according to the control program expanded from the HD 104 to the RAM 103. The proposal server 3 further includes a storage unit 3000 implemented by the RAM 103 and the HD 104 illustrated in FIG. 2.

Tenant Periodic Expense Management Table

FIG. 5 is a conceptual diagram illustrating an example of tenant periodic expense management table. The storage unit 3000 includes a tenant periodic expense management DB 3001, such as a tenant periodic expense management table illustrated in FIG. 5. The table of FIG. 5 stores, for a tenant ID for identifying a tenant that uses a service from the proposal company C (such as the service user company A), a type of expense, a month of payment, and an amount of payment, in association with each other, for each periodic payment that has occurred. In the description of the embodiment, the tenant is defined as a customer unit, more specifically, a unit of one or more users belonging to a group as a customer, such as a company, a business unit, an organization, etc. having a right to use a service, such as the service provided by the communication system, with an agreement or a contract, for example. The service user company A is an example of tenant. This table is used to predict future periodic payments for each tenant.

Tenant-Specific Payment Management Table

FIG. 6 is a conceptual diagram illustrating an example of tenant-specific payment management table. The storage unit 3000 includes a tenant-specific payment management DB 3002, which is implemented by a tenant-specific payment management table illustrated in FIG. 6. The table of FIG. 6 stores, for a tenant ID identifying each tenant, an ID for identifying payment, a biller, a payment due date, an amount of payment, and a payment status indicating whether the payment has been made, in association for each payment, as tenant payment information for each tenant.

Financing Information Management Table

FIG. 7 is a conceptual diagram illustrating an example of financing information management table. The storage unit 3000 includes a financing information management DB 3003, such as a financing information management table as illustrated in FIG. 7. The table of FIG. 7 stores contents of form, used for providing funds to the tenant, such as the service user company A. Examples of such form include, but not limited to, invoice, order form, and quotation issued by the service user company A (creditor, such as seller) to the business partner company B (debtor, such as buyer). The type of form may be referred to as a financing subject type. In view of this, the table stores, for each tenant ID, information such as an ID identifying a form, a business partner to which the form is issued, a financing subject type, a payment due date on the form, an amount of payment (billing amount) on the form, and a payment status, and a storage destination of electronic data of an image (for example, PDF) of the form, in association with each other.

Tenant Bank Account Management Information Table

FIG. 8 is a conceptual diagram illustrating an example of tenant bank account management table. The storage unit 3000 stores a tenant bank account management DB 3004, such as a tenant bank account management table as illustrated in FIG. 8. The table of FIG. 8 stores contents relating to bank accounts, which are previously registered in the proposal server 3. Specifically, the table stores, for each tenant ID, information on each bank account previously registered such as a bank name, a bank branch name, an account number, a name of an account holder (user name), and a password of the account holder in association.

Tenant Credit Card Management Table

FIG. 9 is a conceptual diagram illustrating an example of tenant credit card management table. The storage unit 3000 stores a tenant credit card management DB 3005, such as a tenant credit card management table as illustrated in FIG. 9. The table of FIG. 9 stores contents related to credit cards previously registered in the proposal server 3 by the user. Specifically, the table stores, for each tenant ID, information on each card previously registered such as a card name (card number), a name of an owner of the card (user name), and a password of the owner in association. The credit card information of FIG. 9 is used to determine an amount that each tenant can borrow, which may be later referred to when calculating the cash balance.

Tenant Management Table

FIG. 10 is a conceptual diagram illustrating an example of tenant management table. The storage unit 3000 stores a tenant management DB 3006, such as a tenant management table as illustrated in FIG. 10. The table of FIG. 10 stores contents related to business information of the tenant. The table stores, for each tenant, a tenant ID, a tenant name, a tenant address (location), a tenant industry type, and a tenant business type in association with one another. The tenant information of FIG. 10 is used in selecting a financing service company. For example, when the tenant is in the construction industry, candidates of financing service company are selected but excluding any financing service company that does not provide finance to the construction industry.

Financing Service Type Management Table

FIG. 11 is a conceptual diagram illustrating an example of financing service type management table. The storage unit 3000 stores a financing service type management DB 3007, such as a financing service type management table illustrated in FIG. 11. The table of FIG. 11 stores a financing subject type and a financing service type (a type of procurement) in association with each other, to indicate correspondence between a specific financing subject type and a specific financing service type. This correspondence indicates what particular type of form can be used to apply for financing, for each financing service type.

Financing Service Management Table

FIG. 12 is a conceptual diagram illustrating an example of financing service management table. The storage unit 3000 stores a financing service management DB 3008, such as a financing service management table as illustrated in FIG. 12. The table of FIG. 12 stores, for each financing service type, a financing service name (financing service company name) providing the financing service of the particular type, a non-applicable industry type, a coverage area, information indicating whether a private business can be financed, limit on amount of financing, and a connection URL (destination information) for accessing the financing service server 5 of the financing service company, in association with one another. The non-applicable industry type is an industry type of the tenant that the financing service company does not provide financing. The coverage area indicates a region that the financing service company provides services. When the information indicating whether the private business can be financed is "false", the financing service company provides funds to a corporation but does not provide funds to an individual. The information on the private business with "true" indicates that the financing service company provides funds to an individual as well as a corporation.

Destination Information Management Table

FIG. 13 is a conceptual diagram illustrating an example of destination information management table. The storage unit 3000 stores a destination information management DB 3009, such as a destination information management table as illustrated in FIG. 13. The table of FIG. 13 stores, for each type of information to be acquired, a destination name (company name) of a contact to be accessed and a connection URL (destination information) used for accessing, in association. For example, in order to acquire account information, the service J is contacted.

Credit Information Adjustment Management Table

FIG. 14 is a conceptual diagram illustrating an example of credit information adjustment management table. The storage unit 3000 stores a credit information adjustment management DB 3010, such as a credit information adjustment management table illustrated in FIG. 14. The table of FIG. 14 stores, for each rank of credibility, corresponding credibility rank evaluated by each credit information service company. The credibility rank ranges from 1 to 5, with 1 being the lowest and 5 being the highest. For example, the credibility rank of 5 is assumed to correspond to the rank H provided by the credit information service company H1 (service H1 information), and to the rank 7 provided by the credit information service company H2 (service H2 information). Since the credibility rank differs between credit information service companies, the credibility rank is adjusted.

Credit Information Management Table

FIG. 15 is a conceptual diagram illustrating an example of credit information management table. The storage unit 3000 stores a credit information management DB 3011, such as a credit information management table as illustrated in FIG. 15. The table of FIG. 15 stores correspondence between each business partner and a rank of credibility, which is adjusted by the credit information adjustment management table of FIG. 14.

Recommendation Candidate Information Management Table

FIG. 16 is a conceptual diagram illustrating an example of recommendation candidate information management table. The storage unit 3000 stores a recommendation candidate information management DB 3012, such as a recommendation candidate information management table illustrated in FIG. 16. The table of FIG. 16 stores recommendation candidate information including the contents of a form used for financing. This table stores a business partner, a credibility rank of the business partner, an amount of transaction in relation to the form, a financing subject type, a financing service type (type of procurement), a financing service name (company name), a service charge rate in providing financing, and a date of transfer to the service user company in case of providing financing, in association. The proposal company C selects recommendation information to be proposed to the service user company, from the recommendation candidate information in the table.

Functional Units of Proposal Server

Next, functional units of the proposal server 3 are escribed in detail. In the following description of each functional unit of the proposal server 3, a relationship of each functional unit with some elements illustrated in FIG. 2 is described.

The transmission and reception unit 31 of the proposal server 3 illustrated in FIG. 4, which is implemented by instructions of the CPU 101 and the network I/F 109 illustrated in FIG. 2, transmits or receives various types of data (or information) to or from other terminal, device, apparatus, or system through the communication network 100.

The calculation unit 33, which is implemented by instructions of the CPU 101 illustrated in FIG. 2, has a function of performing various calculations. Details of calculations will be described later.

The determination unit 35, which is implemented by instructions of the CPU 101 illustrated in FIG. 2, has a function of making various determinations. Details of determinations will be described later.

The generation unit 36 is implemented by instructions from the CPU 101 illustrated in FIG. 2, and generates a cash budget screen, as described below.

The storing and reading processing unit 39, which is implemented by instructions from the CPU 101 and the HDD controller 105 illustrated in FIG. 2, performs processing of storing various types of information in the storage unit 3000 and reading various types of information stored in the storage unit 3000.

Processes and Operations

Next, referring to FIGS. 17 to 29, processing, performed by the communication system illustrating in FIG. 1, is described according to the embodiment.

Processing of Displaying Cash Budget Screen

Figure 17:
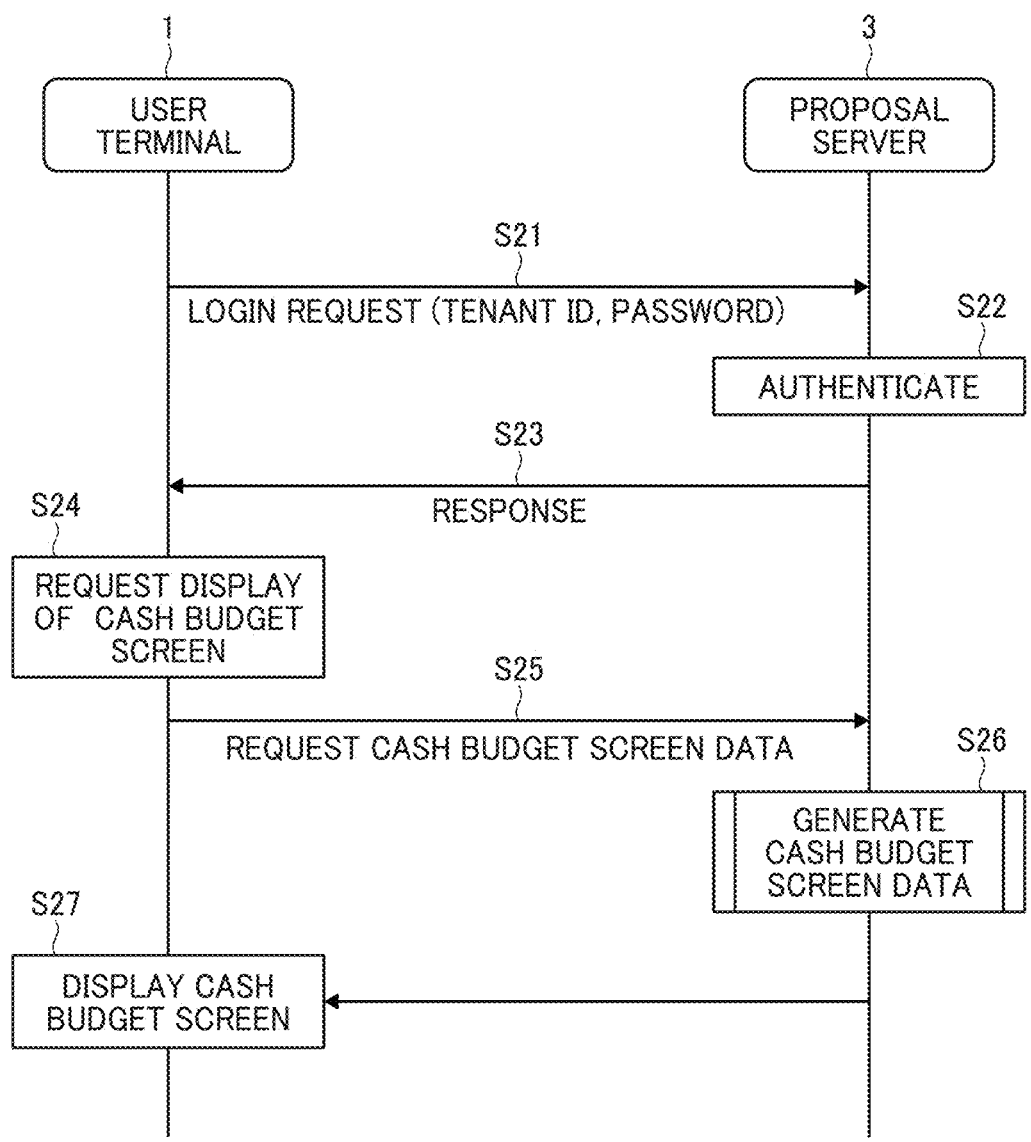
FIG. 17 is a sequence diagram illustrating processing of displaying a cash budget screen, according to the embodiment.

First, referring to FIG. 17, processing of displaying a cash budget screen is described according to the embodiment. FIG. 17 is a sequence diagram illustrating a process of displaying the cash budget screen.

In response to a request from the user A1, the user terminal 1 sends a login request to the proposal server 3 (S21). The login request includes a tenant ID for identifying the service user company A, which is an example of a tenant, and a password associated with the tenant ID. Accordingly, the transmission and reception unit 31 of the proposal server 3 receives the login request. Then, the determination unit 35 of the proposal server 3 performs authentication, and if authentication is successful, determines whether or not the service user company A is an authorized tenant that is authorized to receive the service (S22).

Next, the transmission and reception unit 31 transmits a response to the login request, to the user terminal 1 (S23). The transmission and reception unit 11 of the user terminal 1 receives the response. The following describes the example case in which the service user company A is determined as an authorized tenant.

In response to the user A1 operating the user terminal 1, the acceptance unit 12 receives a request to display a cash budget screen (S24). The transmission and reception unit 11 transmits a request for cash budget screen data to the proposal server 3 (S25). The transmission and reception unit 31 of the proposal server 3 receives the request for the cash budget screen data.

Figure 18:
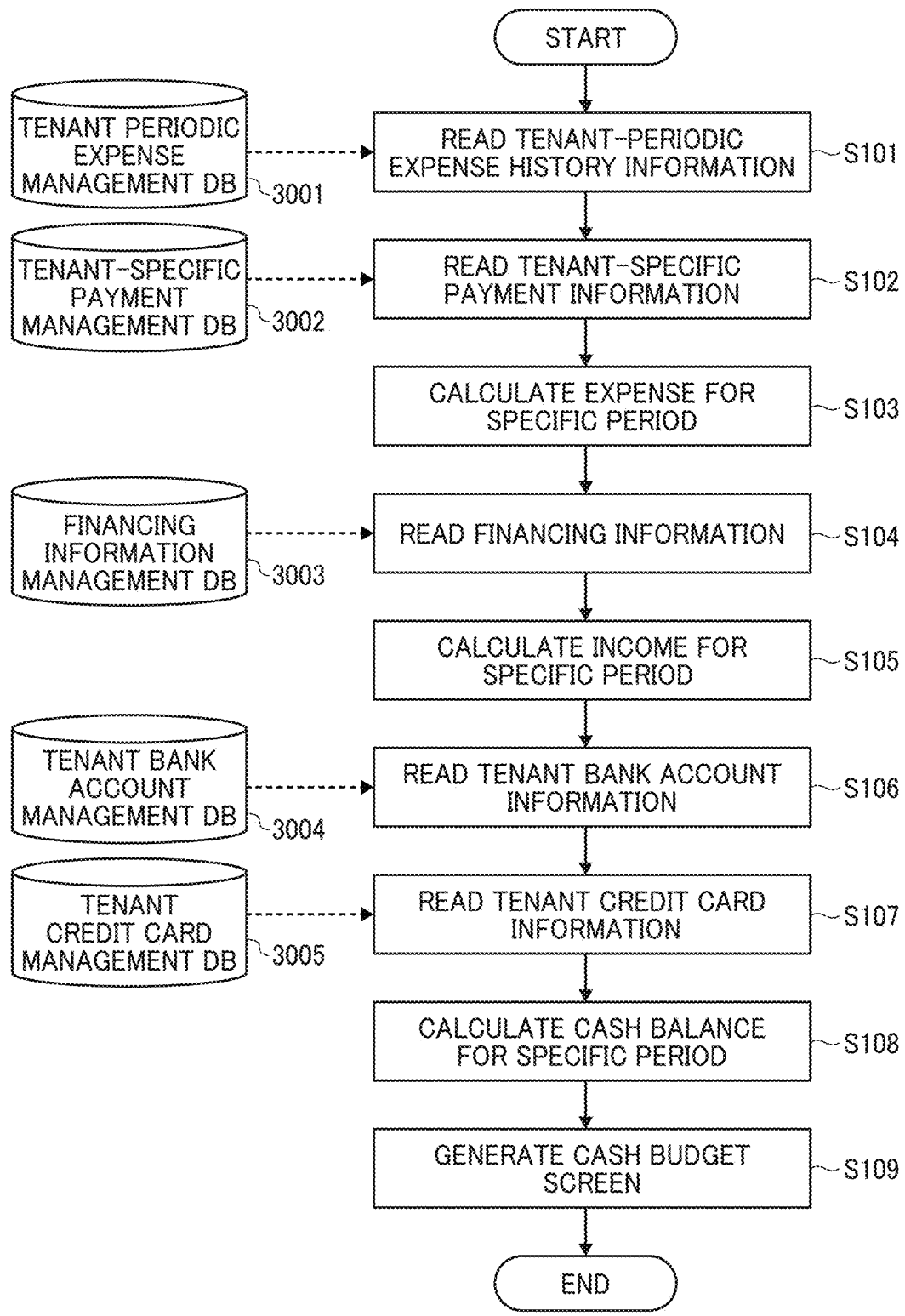
FIG. 18 is a flowchart illustrating processing of generating a cash budget screen, according to the embodiment.

Next, the proposal server 3 performs processing for generating a cash budget screen (S26). Referring to FIG. 18, the processing for generating the cash budget screen is described in detail. FIG. 18 is a flowchart illustrating a process of generating a cash budget screen.

Processing to Generate Cash Budget Screen

As illustrated in FIG. 18, the storing and reading processing unit 39 searches the tenant periodic expense management DB 3001 (see FIG. 5) using the tenant ID used for authentication as a search key to read tenant periodic expense information corresponding to the tenant ID (S101). The storing and reading processing unit 39 further searches the tenant-specific payment management DB 3002 (see FIG. 6) using the tenant ID used for authentication as a search key to read tenant-specific payment information corresponding to the tenant ID (S102). The calculation unit 33 calculates expense of the tenant for each of specific time periods (in this example, one month) based on the tenant periodic expense information and the tenant-specific payment information (S103). The specific time period may be referred to as a predetermined time period, which may be previously set.

Next, the storing and reading processing unit 39 searches the financing information management DB 3003 (see FIG. 7) using the tenant ID for authentication as a search key to read financing information corresponding to the tenant ID (S104). The calculation unit 33 calculates income of the tenant for each of specific time periods (S105).

Next, the storing and reading processing unit 39 searches the tenant bank account management DB 3004 (see FIG. 8) using the tenant ID used for authentication as a search key to read the corresponding tenant bank account information (S106). The storing and reading processing unit 39 further searches the tenant credit card management DB 3005 (see FIG. 9) using the tenant ID used for authentication as a search key to read tenant credit card information corresponding to the tenant ID (S107). The calculation unit 33 calculates a cash balance for each of specific time periods (S108).

Figure 19:
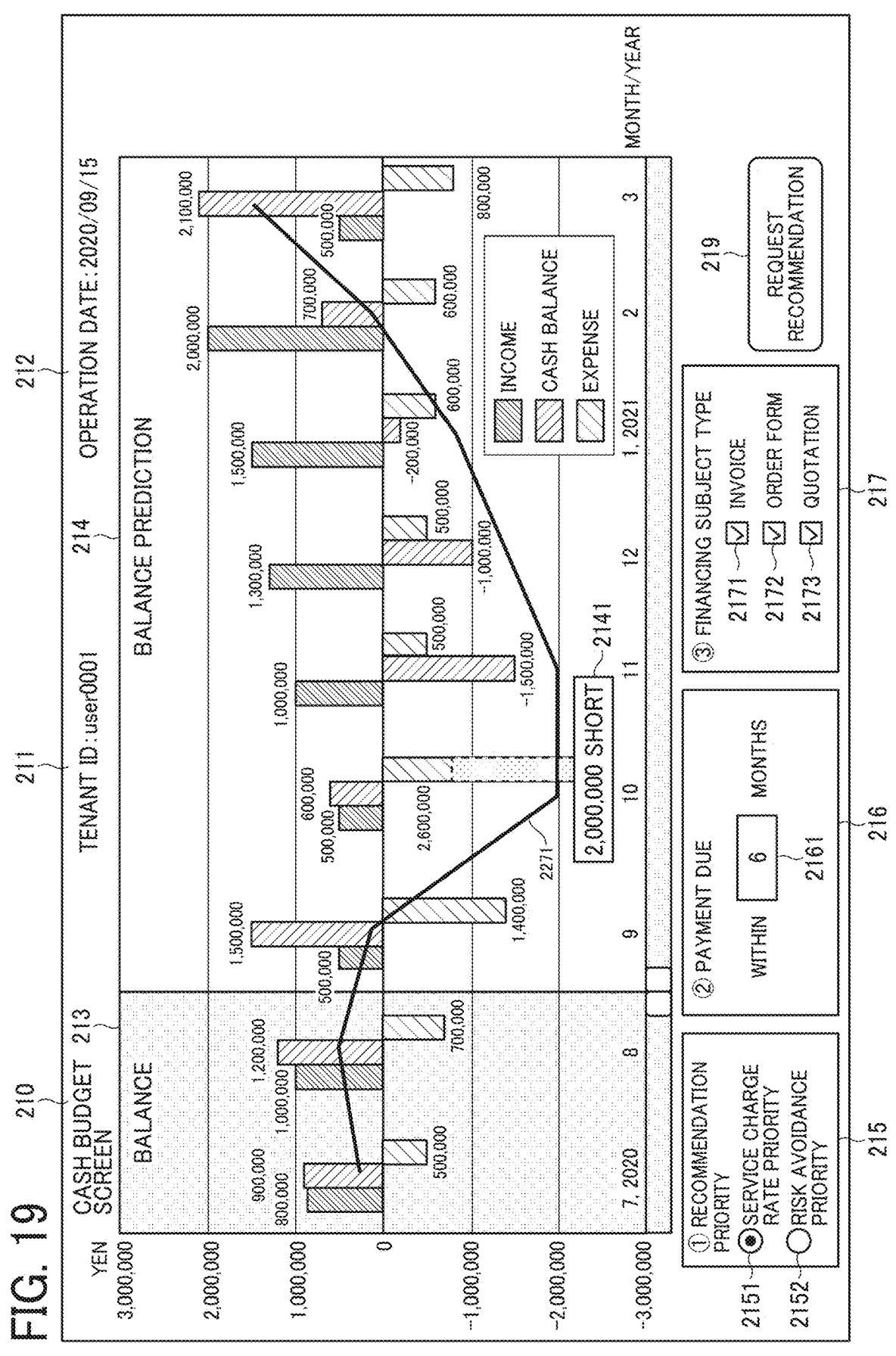

Next, the generation unit 36 generates a cash budget screen as illustrated in FIG. 19 using the calculation results obtained at S103, S105, and S108 (S109). FIG. 19 is an illustration of an example cash budget screen. The processing of generating the cash budget screen then ends.

Subsequently, returning to FIG. 17, the display control unit 14 of the user terminal 1 displays an initial cash budget screen as illustrated in FIG. 19 on the display 106 of the user terminal 1, using the Web browser function (S27).

Initial Cash Budget Screen

Referring to FIG. 19, the initial cash budget screen 210 is described as an example. FIG. 19 is an illustration of an example cash budget screen.

As illustrated in FIG. 19, the cash budget screen 210 includes a tenant ID display field 211, an operation date display field 212, a past balance display field 213, and a future balance display field 214.

Among them, the operation date display field 212 displays a date on which an operation is performed on the cash budget screen, that is, a date when the cash budget screen is displayed. The past balance display field 213 displays the balance (expense, income, and cash balance) for each specific time period (in this example, one month) before the operation date. The balance displayed is a value obtained at the end of the month. For example, in August 2020, income is 1 million yen, cash balance is 1.2 million yen, and expense is 0.7 million yen. The cash balance is a value of "income+cash balance−expense" in July, which is the month just before August.

The future balance display field 214 displays a predicted balance (expense, income, and cash balance) for each month after the operation date. Since the predicted balance is calculated as a value to be obtained at the end of month, when the operation date is September 15, the future balance display field 214 displays a predicted balance at the end of September. In this example, a message 2141 indicating that the balance will be 2,000,000 yen short at the end of October is displayed. The predicted expense in October is 2,600,000 yen. With respect to this 2,600,000 yen, only the 600,000 yen of the cash balance that certainly exists by the payment date is used to compensate. As a result, the message 2141 indicating the shortage of 2,000,000 yen in October is displayed. Since the predicted income of 500,000 yen in October may not be in time by the payment date of 2,600,000 yen, this 500,000 yen is not to be used to compensate the expense of 2,600,000 yen. Accordingly, the user A1 can visually and easily see that the balance will be 2,000,000 yen short at the end of October 2020.

The future balance display field 214 further displays a line graph 2271 indicating "difference between cash balance and expense" for a predetermined time period (in this example, one month). With this graph, the user A1 can easily see a specific month at which "the difference between the cash balance and the expense" becomes minus, indicating that the service user company A is at a deficit. Thus, the user A1 knows that funds are needed in preparation for the deficit in October.

The lower part of the cash budget screen 210 includes three entry fields 215 to 217 for receiving a selection or an input from the user. For the user A1, or the service user company A, the financing service company is a financing source that provides funds.

The entry field 215 allows the user A1 to input the condition on recommendation priority, and includes a "service charge rate priority" radio button 2151 and a "risk avoidance priority" radio button 2152.

The "service charge rate priority" is an example of a predetermined condition for determining a specific financing source from among a plurality of financing sources (financing service companies), by giving higher priority to the financing service having a low service charge rate. The service charge rate of the financing service is determined based on information on the respective financing sources and the respective forms. When the user presses a "service charge rate priority" radio button 2151, the proposal server 3 proposes recommendation information in which the service charge rate is prioritized, as described later.

The "risk avoidance priority" is an example of a predetermined condition for determining a specific financing source from among a plurality of financing sources (financing service companies), by giving priority to minimizing the risk while taking into account credibility of the business partner. When the user presses a "risk avoidance priority" radio button 2152, the proposal server 3 provides recommendation information giving priority to minimizing the risk, as described later. For example, when there is a high possibility that accounts receivable cannot be collected from a debtor as a business partner company, funds are provided while giving priority to accounts receivable to such company.

The entry field 216 indicates financing subjects, i.e., forms, to be considered, for example, by allowing the user A1 to enter information on a payment due date of the financing subject. Specifically, the entry field 216 includes a period entry field 2161 for allowing the user to input a value determined by a unit time period. In this example, one month, which is a value of the specific time period, is set as a unit time period. FIG. 19 illustrates an example case in which 6 months is input, such that the financing subjects (forms) having payment due date that falls within a time period from the month including the operation date (here, September 2020) to the month after six months (February 2021) are only considered. That is, the recommendation information described below is limited to information including forms each having payment due date until February 2021.

The entry field 217 indicates a financing subject type, and includes check boxes 2171, 2172, and 2173 that respectively correspond to "invoice", "order form", and "quotation", as specific examples of the financing subject type. Of the check boxes 2171 to 2173, a document (including electronic data) as indicated by the financing subject type checked by the user A1 will be the subject for financing. As illustrated in FIG. 19, in the present embodiment, the type of a financing subject includes a "quotation" before transaction (sales) occurs. That is, by selecting (specifying) the financing subject type, i.e., the procurement type, the user may reduce a number of candidates of the financing source (financing service company).

The cash budget screen of FIG. 19 further includes a "request recommendation" button 219, which is a button to be pressed by the user to request the proposal server 3 to recommend the most suitable financing source (financing service company), which matches various conditions selected or input by the user through the entry fields 215, 216, and 217.

Processing to Display Recommendation Screen

Figure 20:
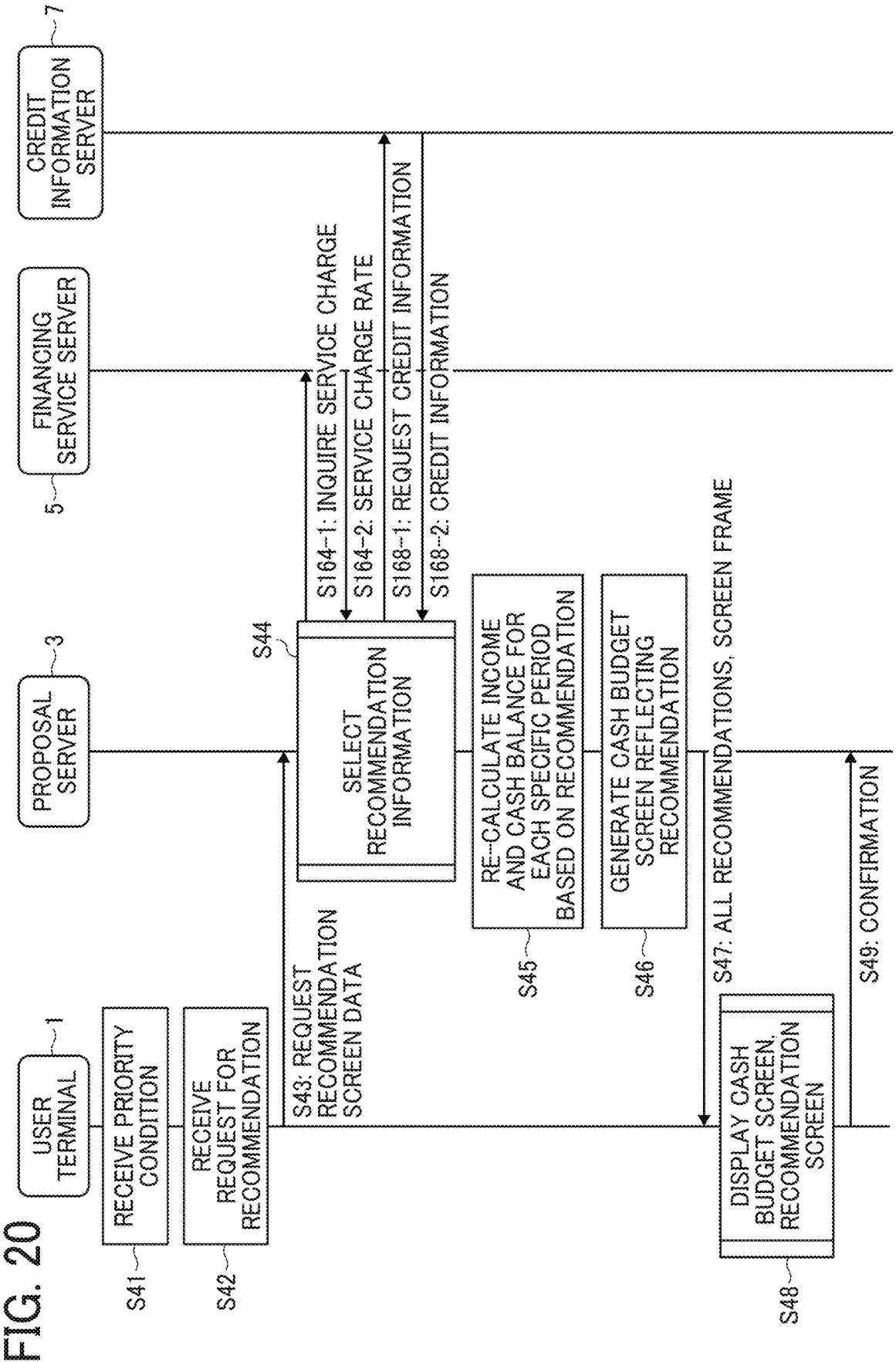
FIG. 20 is a sequence diagram illustrating processing of displaying a cash budget screen and a recommendation screen, according to the embodiment.

Next, referring to FIGS. 19 to 29, processing to display a recommendation screen is described according to the embodiment. FIG. 20 is a sequence diagram illustrating processing to display the cash budget screen and the recommendation screen, according to the embodiment.

In response to the user A1 selecting and inputting information in the fields 215 to 217 of the screen of FIG. 19, the acceptance unit 12 receives selection and input of various information such as a priority condition (S41). Further, in response to the user A1 pressing the "request recommendation" button 219, the acceptance unit 12 receives a request for recommendation screen (S42). The transmission and reception unit 11 transmits a request for recommendation screen data to the proposal server 3 (S43). The process of step S43 corresponds to the process of step S2 described above. Therefore, the request for recommendation screen includes the above-described condition information (see S2). The condition information includes various information obtained by the selection and input received at S41, and indicates a predetermined condition used for determining financing using the form issued when the user A1 (that is, the service user company A) provides a product or service.

Next, the proposal server 3 performs processing to select recommendation information (S44). Referring now to FIGS. 21 to 29, the processing of selecting the recommendation information is described in detail according to the embodiment.

Processing to Generate Recommendation Screen

Figure 21:
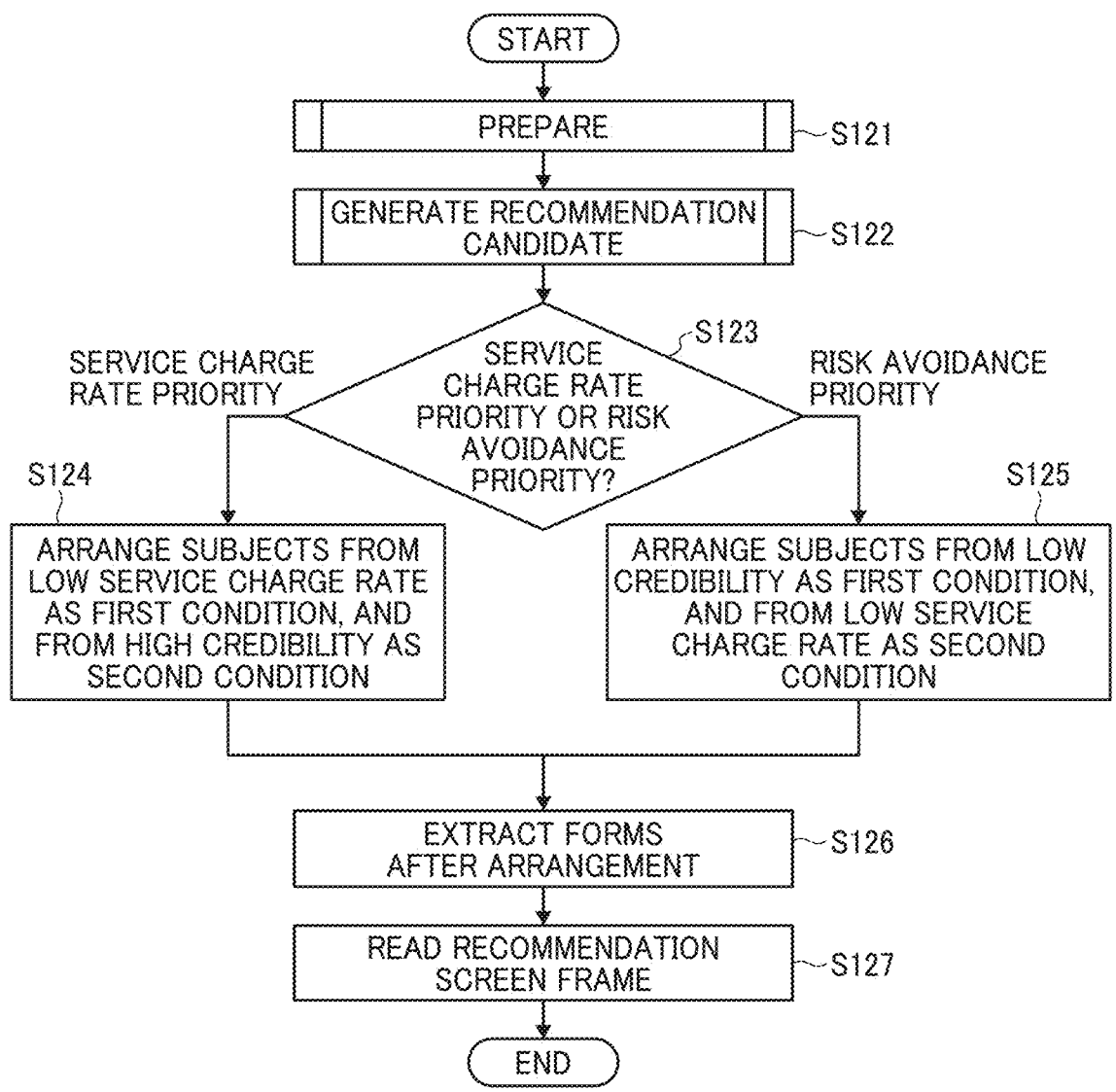
FIG. 21 is a flowchart illustrating processing of selecting recommendation information, according to the embodiment.

FIG. 21 is a flowchart illustrating processing of selecting recommendation information, according to the embodiment. As illustrated in FIG. 21, when generating the recommendation screen, the proposal server 3 performs a preparation process (S121), as a process of specifying one or more financing service companies to which an inquiry about a service charge rate is made, from among a plurality of financing service companies (financing sources).

Preparation

Figure 22:
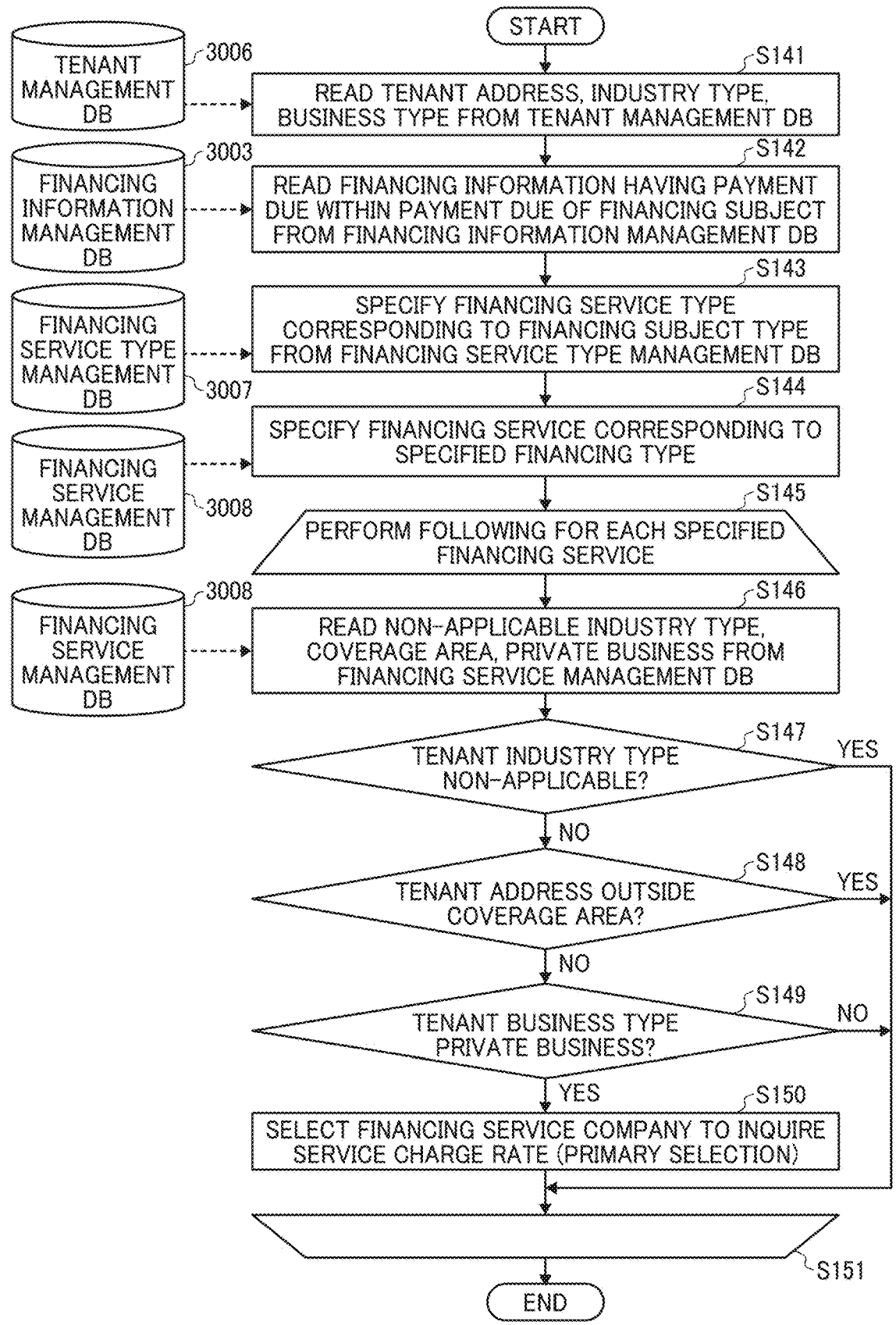
FIG. 22 is a flowchart illustrating the preparation process, according to the embodiment.

Referring to FIG. 22, the preparation process is described in detail according to the embodiment. FIG. 22 is a flowchart illustrating the preparation process.

First, the storing and reading processing unit 39 searches the tenant management DB 3006 (see FIG. 10) by using the tenant ID used for authentication as a search key, to read business information of the tenant such as an address, an industry type, and a business type of the tenant (S141).

Next, the storing and reading processing unit 39 reads, from the financing information management DB 3003 (see FIG. 7), each record of financing information having the payment due date that falls within a time period indicated by the "financing subject payment due date" input in the entry field 216 of FIG. 19 (S142). For example, if 6 months is input as illustrated in FIG. 19, records of financing information up to February is selected.

Next, the storing and reading processing unit 39 refers to the financing service type management DB 3007 (see FIG. 11), and obtains the financing service type (procurement type) corresponding to the "financing subject type" selected in the entry field 217 of FIG. 19 (S143). In this example of FIG. 19, since all financing subject types are selected, all financing service types illustrated in FIG. 11 are specified.

The storing and reading processing unit 39 searches the financing service management DB 3008 (see FIG. 12) using the information on the financing service type obtained at S143 as a search key, and obtains records (financing service information) each including the financing service name as indicated by the obtained financing service type (S144).

Subsequently, the proposal server 3 repeatedly executes the processing, from S145 to S151, that is, the steps S146 to S150, for each record of the financing service information that is obtained.

First, the storing and reading processing unit 39 reads "non-applicable industry type", "coverage area", and "private business" of the financing service, from financing service information specified at S145 (S146).

The determination unit 35 determines whether to select the financing service information as a result of primary selection based on each information read or obtained by the storing and reading processing unit 39 at steps S141 to 146 described above. Specifically, the determination unit 35 determines whether or not the tenant industry type of the service user company A is the non-applicable industry type, based on the "non-applicable industry type" information (S147). In this example, since the industry type of the service user company A is construction, the service B2 having the non-applicable industry type of construction is excluded from selection. When the industry type is not the non-applicable industry type (S147; NO), the determination unit 35 determines whether the tenant address of the service user company A is outside the coverage area (S148). When the area is not outside the coverage area (S148; NO), the determination unit 35 determines whether the business type of the tenant of the service user company A is supported by the financing service based on information on the private business (S149). For example, if the service user company A is a private business, whether or not the private business indicates "true" is determined. Since the service user company A is corporation in this example, it is determined that all financing services support the tenant business. When the business type of the tenant is supported by the financing service based on the private business (S149; YES), the determination unit 35 determines the financing service (company) as a financing source candidate to which the inquiry about the service charge rate is made (S150). The operation then returns to S145, to select a financing service to be processed next. The proposal server 3 then performs the same processing on the next financing service. On the other hand, in the case of YES at S147, YES at S148, or NO at S149, the proposal server 3 does not execute the processing of S150, such that the financing service is not selected as a financing source candidate. The operation returns to S145, and proceeds to perform the same processing on the next financing service. When all financing service information acquired at S144 are processed, the operation of FIG. 22 ends.

As described above, the proposal server 3 selects (primary selection) one or more financing services, as a financing source candidate to be inquired about the service charge rate, from among all financing services specified at S144.

Next, returning to FIG. 21, the proposal server 3 generates recommendation candidate information, which includes candidates of recommendation information to be proposed to the user A1 (the service user company A) (S122).

Generation of Recommendation Candidate Information

Figure 23:
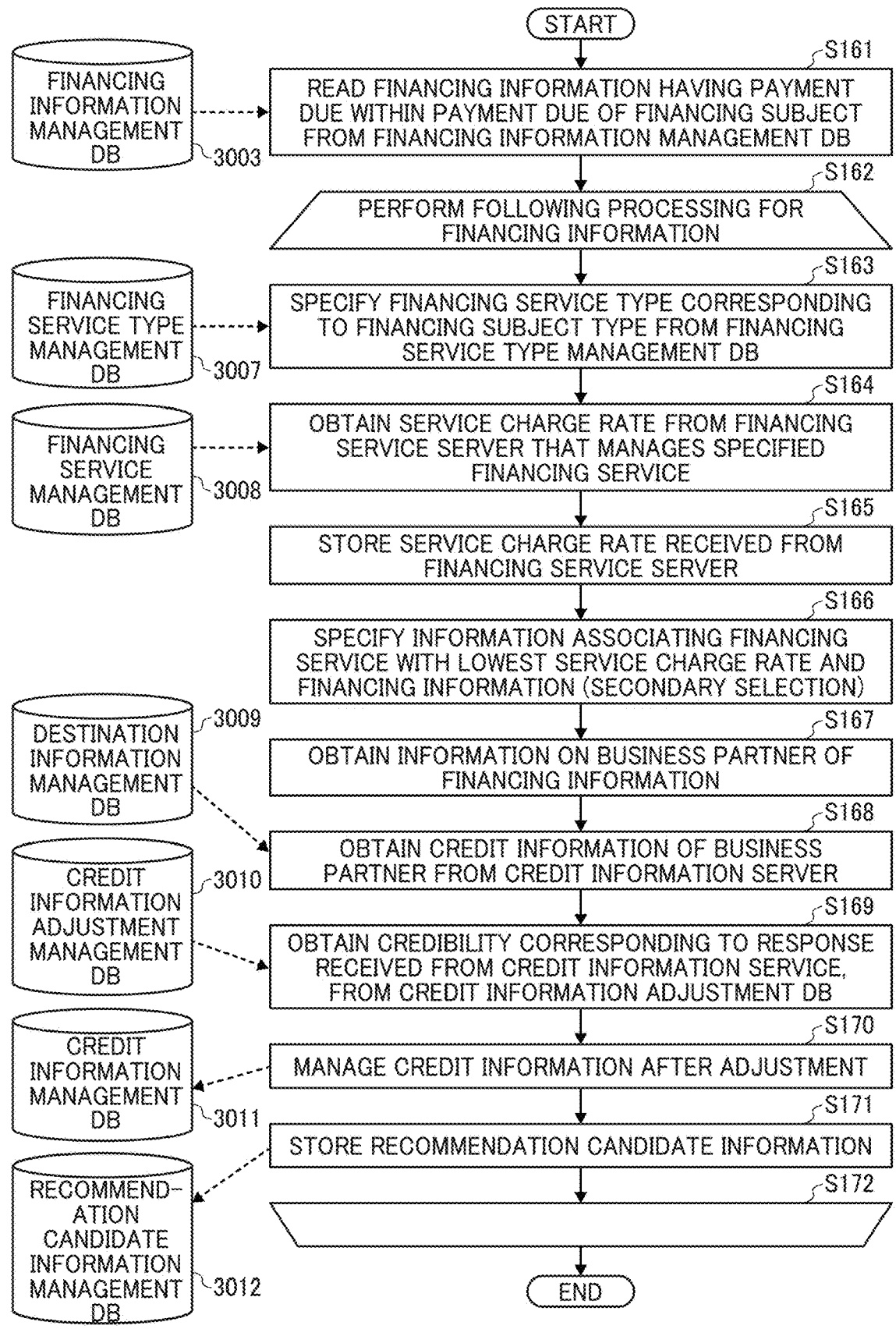
FIG. 23 is a flowchart illustrating processing of generating recommendation candidate information.

Referring to FIG. 23, processing of generating recommendation candidate information is described according to the embodiment. FIG. 23 is a flowchart illustrating processing of generating recommendation candidate information.

As illustrated in FIG. 23, the storing and reading processing unit 39 reads, from the financing information management DB 3003 (see FIG. 7), each record of financing information having the payment due date that falls within a time period indicated by the "financing subject payment due date" input in the entry field 216 of FIG. 19 (S161). Subsequently, the proposal server 3 repeatedly executes the processing, from S161 to S172, that is, the steps S162 to S171, for each record of the financing service information read out at S161.

First, the storing and reading processing unit 39 refers to the financing service type management DB 3007 (see FIG. 11), and obtains the financing service type (procurement type) corresponding to the "financing subject type" selected in the entry field 217 of FIG. 19 (S163).

Next, the transmission and reception unit 31 generates inquiry information for each financing service having the financing service type that is obtained at S163, from among the candidates of financing services (companies) to be inquired for the service charge rate obtained at S121. The transmission and reception unit 31 transmits the inquiry information to the financing service server 5 that manages each financing service to acquire a service charge rate (S164). The transmission and reception unit 31 refers to the destination information of the financing service server 5, each stored in the destination information management DB 3009 (see FIG. 12) to send inquiry about the service charge rate. For example, the connection URL is obtained. The processing of S164 corresponds to S164-1 and S164-2 of FIG. 20. Specifically, the transmission and reception unit 31 of the proposal server 3 transmits inquiry information of the service charge rate to each of the financing service servers 5 (S164-1), and receives information on the latest service charge rate from each of the financing service servers 5 (S164-2).

Next, the storing and reading processing unit 39 stores the service charge rate information received from each of the financing service servers 5 in the storage unit 3000 (S165).

Next, the generation unit 36 obtains information that associates the financing service having the lowest service charge rate and the financing information, as a subject to be compared as described later (secondary selection) (S166). For example, in FIG. 16, for an example case of the business partner being Corporation X1 and the financing subject type being the invoice having the transaction amount of 900,000 yen, the financing services A1, A2, B1, B2 and the like are candidates of financing source. Of these candidates, the financing service B2 with the lowest service charge rate (5%) is selected. The information associating the financing service B2, and the financing information (X1 Corporation, credibility of 5, and the invoice having the transaction amount of 900,000 yen) is obtained for later comparison.

The storing and reading processing unit 39 then obtains credit information (for example, credibility) of the business partner (company), from the financing information read at S161 (S167).

Next, the transmission and reception unit 31 obtains credit information of the business partner company B from each credit information server 7 (S168). In this case, the transmission and reception unit 31 refers to the destination information of each credit information service, which is stored in the destination information management DB 3009, and sends the inquiry to the credit information server 7 of each credit information service. The processing of S168 corresponds to S168-1 and S168-2 of FIG. 20. Specifically, the transmission and reception unit 31 of the proposal server 3 transmits a request for credit information to each of the credit information servers 7 (S168-1), and receives the credit information from each of the credit information servers 7 (S168-2).

As described above, contents of the credit information differ between credit information service companies. For example, some companies evaluate credit information in three ranks of "H, N, and L", and other companies evaluate credit information in seven ranks of "7 to 1", and thus adjustment is desirable. Therefore, in order to normalize different credibility rank scales, the storing and reading processing unit 39 refers to the credit information adjustment management DB 3010, and adjusts the credibility rank received from the credit information servers 7 into the credibility rank that is standardized (S169). The storing and reading processing unit 39 stores the credibility of each business partner (company), after adjustment, in the credit information management DB 3011 (S170).

The storing and reading processing unit 39 manages recommendation candidate information obtained at S161 to S171 for each business partner in the recommendation candidate information management DB 3012 (see FIG. 16) (S171).

As described above, the proposal server 3 is able to manage recommendation candidate information.

Rearrangement of Recommendation Information

Next, returning to FIG. 21, processing of rearranging (sorting) recommendation candidate information, as recommendation information according to priority information selected using the screen of FIG. 19, is described according to the embodiment.

When the service charge rate priority is selected as the priority condition of recommendation in FIG. 19 (S123; service charge rate priority), the storing and reading processing unit 39 analyzes the recommendation candidate information in the recommendation candidate information management DB 3012, to finally select recommendation information suitable to a request from the user. In view of this, the storing and reading processing unit 39 rearranges the candidates of recommendation information under the first condition for arranging in the order from the lowest service charge rate, and under the second condition for arranging in the order from the highest credibility. The storing and reading processing unit 39 then reads recommendation information that is suitable to the service charge rate priority (S124). In the example of FIG. 16, recommendation candidate information indicating the service B2 with the lowest service rate of 5% in connection with the invoice with a transaction amount of 900,000 yen for X1 Corporation, recommendation candidate information indicating the service B1 with the lowest service charge rate of 6% in connection with the invoice with a transaction amount of 500,000 yen for X2 Corporation, and recommendation candidate information indicating the service B2 with the lowest service charge rate of 7% in connection with the invoice with a transaction amount of 800,000 yen for X3 Corporation are compared. If these recommendation candidate information are sorted in the order from the lowest service charge rate (first condition), a combination of the invoice with a transaction amount of 900,000 yen for X1 Corporation and the service B2 (service charge rate 5%), a combination of the invoice with a transaction amount of 500,000 yen for X2 Corporation and the service B1 (service charge rate 6%), and a combination of the invoice with a transaction amount of 800,000 yen for X3 Corporation and the service B2 (service charge rate 7%) are arranged in this order. If there is a plurality of recommendation candidates having the same service charge rate, the recommendation candidates having the same service charge rate are rearranged in the order from the highest credibility (second condition). That is, the recommendation candidates are sorted under the first condition, and then the recommendation candidates that cannot be sorted under the first condition are sorted under the second condition. The same applies to a case where the risk avoidance priority is selected as a priority condition described later.

On the other hand, when the risk avoidance priority is selected as the priority condition of recommendation in FIG. 19 (S123; risk avoidance priority), the storing and reading processing unit 39 analyzes the recommendation candidate information in the recommendation candidate information management DB 3012 to finally select recommendation information suitable to a request from the user. In view of this, the storing and reading processing unit 39 rearranges the candidates of recommendation information under the first condition for arranging in the order from the lowest credibility, and under the second condition for arranging in the order from the lowest service charge rate. The storing and reading processing unit 39 then reads recommendation information that is suitable to the risk avoidance priority (S125).

Next, the storing and reading processing unit 39 extracts one or more forms, from the recommendation candidate information sorted at S124 or S125, so as to compensate for the amount of deficit with the amount to be paid in connection with the forms (S126).

Then, the storing and reading processing unit 39 reads the recommendation screen frame stored in the storage unit 3000 (S127).

Processing to Update Display of Cash Budget Screen

Next, returning to FIG. 20, processing of displaying the cash budget screen after updating is described, according to the embodiment.

First, after the processing of selecting the recommendation information at S44, the calculation unit 33 recalculates the income and the cash balance for each specific period (in this example, each month) based on the amount of invoice and the payment due date in the recommendation information (S45). The generation unit 36 generates a cash budget screen that reflects the recommendation information (S46).

Next, the transmission and reception unit 31 transmits all items of recommendation information recalculated at S45 and the recommendation screen frame read at S127 to the user terminal 1 (S47). The transmission and reception unit 11 of the user terminal 1 receives all items of recommendation information and the recommendation screen frame. The processing of S45 corresponds to the processing of S3 described above.

Figure 25:
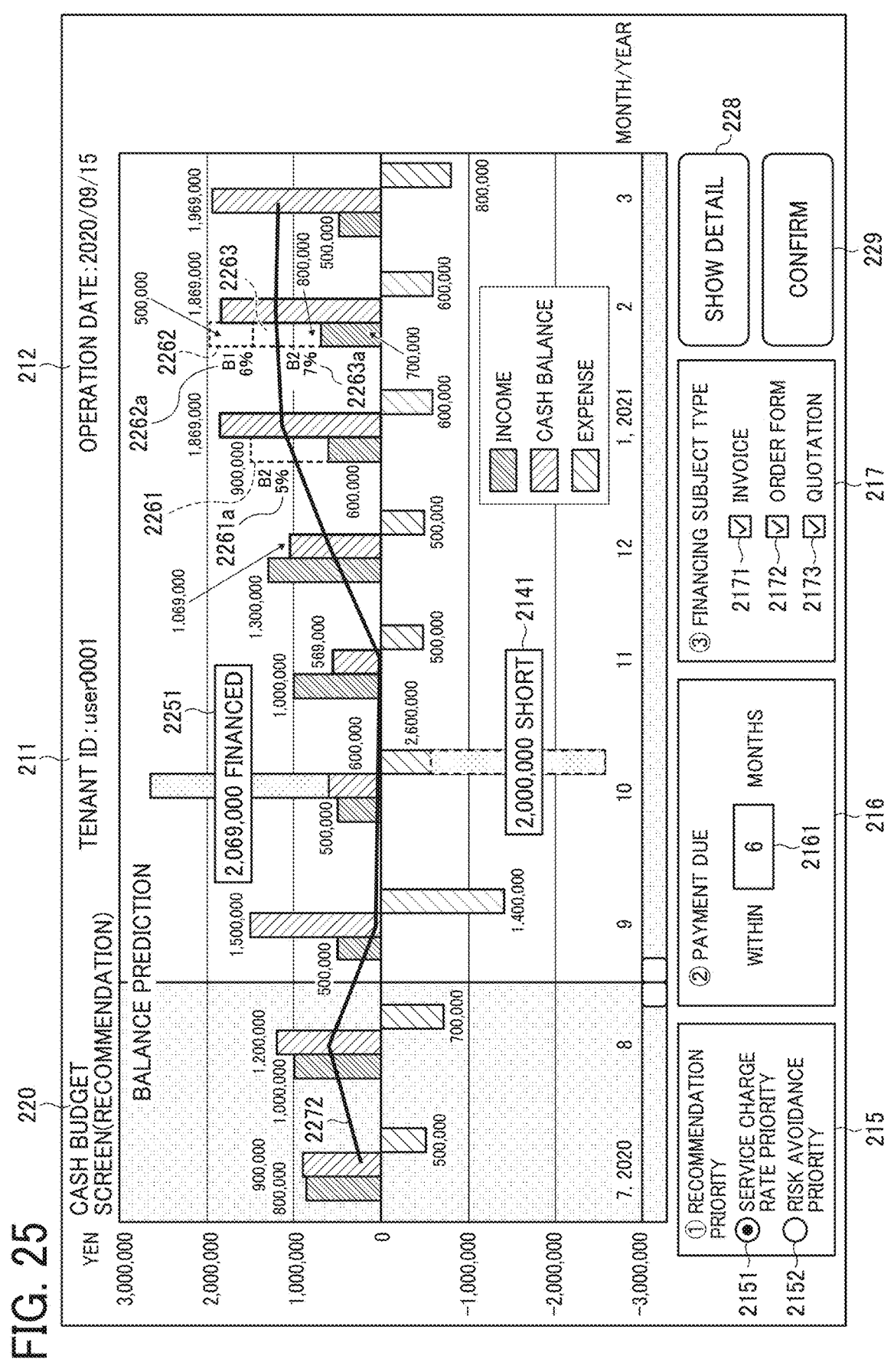

Next, at the user terminal 1, the display control unit 14 displays a cash budget screen as illustrated in FIG. 25 and a recommendation screen as illustrated in FIG. 26 (or FIG. 27) on the display 106 of the user terminal 1. The display control unit 14 places the recommendation information in the recommendation screen frame received at S47 to generate the recommendation screen (S48). At this time, in FIGS. 26 and 27, the check box is not checked.

Processing to Display Cash Budget Screen and Recommendation Screen

Figure 24:
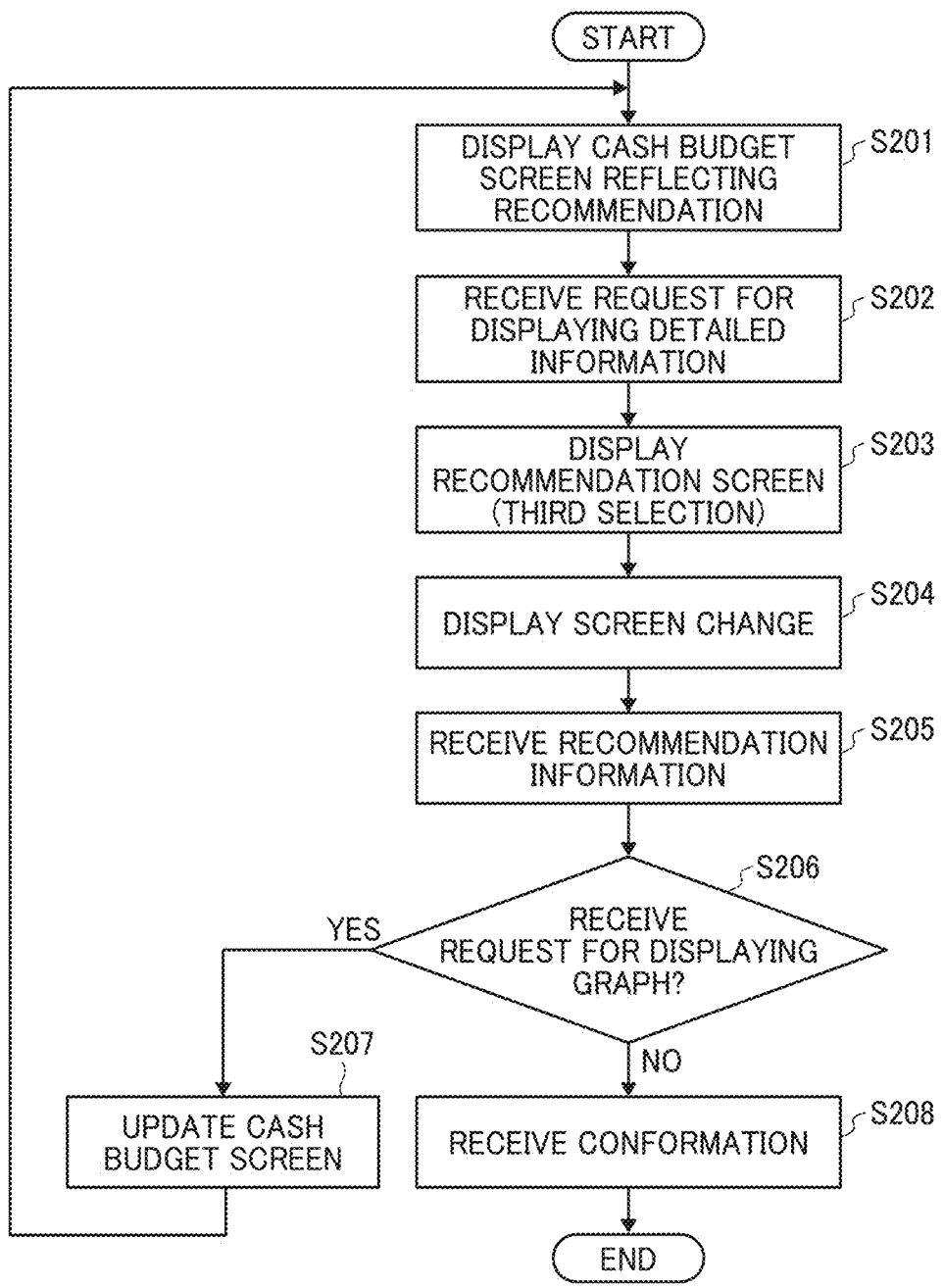
FIG. 24 is a flowchart illustrating processing of displaying a cash budget screen and a recommendation screen, according to the embodiment.

Referring now to FIGS. 24 to 27, processing of step S48 is described in detail according to the embodiment. FIG. 24 is a flowchart illustrating processing of displaying the cash budget screen and the recommendation screen.

As illustrated in FIG. 24, the display control unit 14 displays a cash budget screen that reflects the recommendation information received at S47 on the display 106 of the user terminal 1 (S201).

Cash Budget Screen Reflecting Recommendation Information

Referring to FIG. 25, a cash budget screen 220 reflecting the recommendation information in the case of selecting the service charge rate priority is described, according to the embodiment. FIG. 25 is a diagram illustrating an example display of the cash budget screen reflecting the recommendation information in the case of selecting the service charge rate priority.

As illustrated in FIG. 25, the cash budget screen 220 displays a message 2251 indicating that 2,069,000 yen can be financed, compared with the cash budget screen 210 of FIG. 19. Further, the income and the cash balance after October 2020 are changed assuming that 2,069,000 yen is financed. In this case, since funds acquired by the user A1 (service user company A) in October 2020 are not considered as income, dotted bars 2261, 2262, and 2263 each indicate that a corresponding amount of money differs from income.

The future balance display field 214 further displays a line graph 2272 indicating "difference between cash balance and expense" for each predetermined time period (in this example, one month). With this graph, the user A1 can easily grasp that there is no month in which "the difference between the cash balance and the expense" becomes minus, indicating that the deficit can be avoided by financing.

The cash budget screen 220 further includes a "show detail" button 228 and a "confirm" button 229 at the lower right. The "show detail" button 228 is a button to be pressed when the user A1 wants to display the recommendation screen illustrated in FIG. 26. The "confirm" button 229 is a button to be pressed when the user A1 confirms the contents illustrated in FIG. 25 and confirms the contents of recommended financing. When the "confirm" button 229 is pressed, the processing of S49 in FIG. 20 is performed.

In response to the user A1 pressing the "show detail" button 228 of FIG. 25, as illustrated in FIG. 24, the acceptance unit 12 receives a request for displaying detailed information (S202). The display control unit 14 displays a recommendation screen (the service charge rate priority is selected) as illustrated in FIG. 26.

Recommendation Screen (Service Charge Rate Priority)

Referring to FIG. 26, the example case in which the recommendation screen includes the recommendation information when the service charge rate is prioritized is described according to the embodiment. FIG. 26 is a diagram illustrating an example display of the recommendation screen in the case of selecting the service charge rate priority.

As illustrated in FIG. 26, the recommendation screen 250 includes each item of recommendation information. Each recommendation information includes a business partner, a financing subject type, an amount of transaction, and a payment due date, as information regarding a form to be used for determining financing. The recommendation information further includes a financing type, a financing source, a service charge rate, an amount of financing, and a payment date, as information regarding a financing source. The recommendation information further includes credibility of the business partner. On the recommendation screen 250, a check box for selection is displayed on left of each recommendation information. The amount of transaction is an amount expected to be obtained by the user (in this example, the service user company A) from the business partner (in this example, the business partner company B) in relation to the transaction as indicated by the form. Further, the amount of financing (financed amount) is an amount to be obtained by the user (in this example, the service user company A) from the financing service company (financing source), and is the amount from which the service charge rate is subtracted. As illustrated in FIG. 26, all check boxes are initially checked when being displayed.

The recommendation screen 250 further includes a total amount of financing (total amount financed) and an amount of shortage at lower left. The total amount of financing is a sum of the amounts of financing of selected recommended information each having its check box checked by the user A1. Initially, the total amount of financing is determined to be the lowest amount that exceeds the shortage.

The recommendation screen 250 further includes a "show graph" button 256, a "confirm" button 257, and a "show other recommendation" button 258, at its lower right. The "show graph" button 256 is a button to be pressed by the user A1 to request update and display of the cash budget screen 220 of FIG. 25, after reflecting the recommendation information. The "confirm" button 257 is a button to be pressed by the user A1 to confirm the displayed content of FIG. 26. When the "confirm" button 257 is pressed, the user terminal 1 transmits confirmation information indicating that confirmation has been made to the proposal server 3. The "show other recommendation" button 258 is a button to be pressed by the user A1 to request display of other recommendation information.

In response to the user A1 pressing the "show other recommendation" button 258, the display control unit 14 changes the recommendation screen 250 to a recommendation screen 251 as illustrated in FIG. 27 (S204). In this example, two items of recommendation information are newly displayed, but the check box is not checked for neither one. When the user A1 checks the check box, the acceptance unit 12 receives the selection of the recommendation information that is checked (S205). This causes selection of recommendation information, for the third time, based on the recommended information displayed in the recommendation information of FIG. 26.

Returning to FIG. 24, in response to the user A1 pressing the "show graph" button 256, the acceptance unit 12 receives a request for updating display of the cash budget screen (S206; YES). The display control unit 14 updates and displays the cash budget screen based on the latest recommended information received at S205 (S207). The operation then returns to the processing of S201.

On the other hand, in response to the user A1 pressing the "confirm" button 257 without pressing the "show graph" button 256 (S206; NO), the acceptance unit 12 receives confirmation of the financing subject (form) recommended by the proposal server 3, as indicated by the recommendation information of FIG. 24 (S208). The operation then returns to FIG. 20. Specifically, the transmission and reception unit 11 of the user terminal 1 transmits the confirmation information indicating the contents confirmed at S208 to the proposal server 3 (S49). The transmission and reception unit 31 of the proposal server 3 receives the confirmation information.

As described above, the user A1 of the service user company A is able to decide to raise funds (receiving financing) for one or more forms selected from among a plurality of forms (such as invoices), as proposed by the proposal server 3.

The recommendation screens of FIGS. 26 and 27 each includes information on a form subject to financing and information on a financing source as described above. Alternatively, the recommendation screen may include one of the information on a form subject to financing and the information on a financing source.

The cash budget screen of FIG. 25 displays contents in the case of selecting the service charge rate priority. Since the cash budget screen displays the same types of content in the case of selecting the risk avoidance priority, description thereof will be omitted. Similarly, the recommendation screen of FIGS. 26 and 27 each display contents in the case of selecting the service charge rate priority. Since the recommendation screen displays the same types of content in the case of selecting the risk avoidance priority, description thereof will be omitted.

The following describes detailed processing, performed by the communication system, when the user A1 changes selection (checked or not checked) of the recommendation information on the recommendation screen 251 of FIG. 27. FIG. 28 is an illustration of a display example after the user A1 has changed selection of the recommended information in the case when the service charge rate priority is selected.

The recommendation screen 252 illustrated in FIG. 28 is a recommendation screen, which is displayed in a case where the third check box from the top is unchecked and the fourth and fifth check boxes from the top are checked in accordance with the operation of the user A1 in the recommendation screen 251 illustrated in FIG. 27. The total amount of financing, displayed at the lower left of the recommendation screen 252, is updated to reflect a sum of the amounts of financing of the selected recommendation information each having the check box that is checked, every time the selection status of the check box is changed.

The following is an example case in which selection of form used for financing is desirably changed from one or more financing subjects proposed by the proposal server 3. For example, there may be a business partner from which the user A1 (the service user company A) wants to collect the accounts receivable, in preference to the business partner of the financing subject (the form) proposed by the proposal server 3. For example, the user A1 (the service user company A) may determine that there is a situation (for example, there is a possibility of bankruptcy) such that it may be difficult to collect the accounts receivable from a recent transaction, although the business partner has high credibility in the credit information management DB 3011.

In response to the user A1 pressing the "show graph" button 256 on the recommendation screen 252, the acceptance unit 12 receives a request for updating display of the cash budget screen. The display control unit 14 updates and displays the cash budget screen based on the latest recommendation information.

Figure 29:
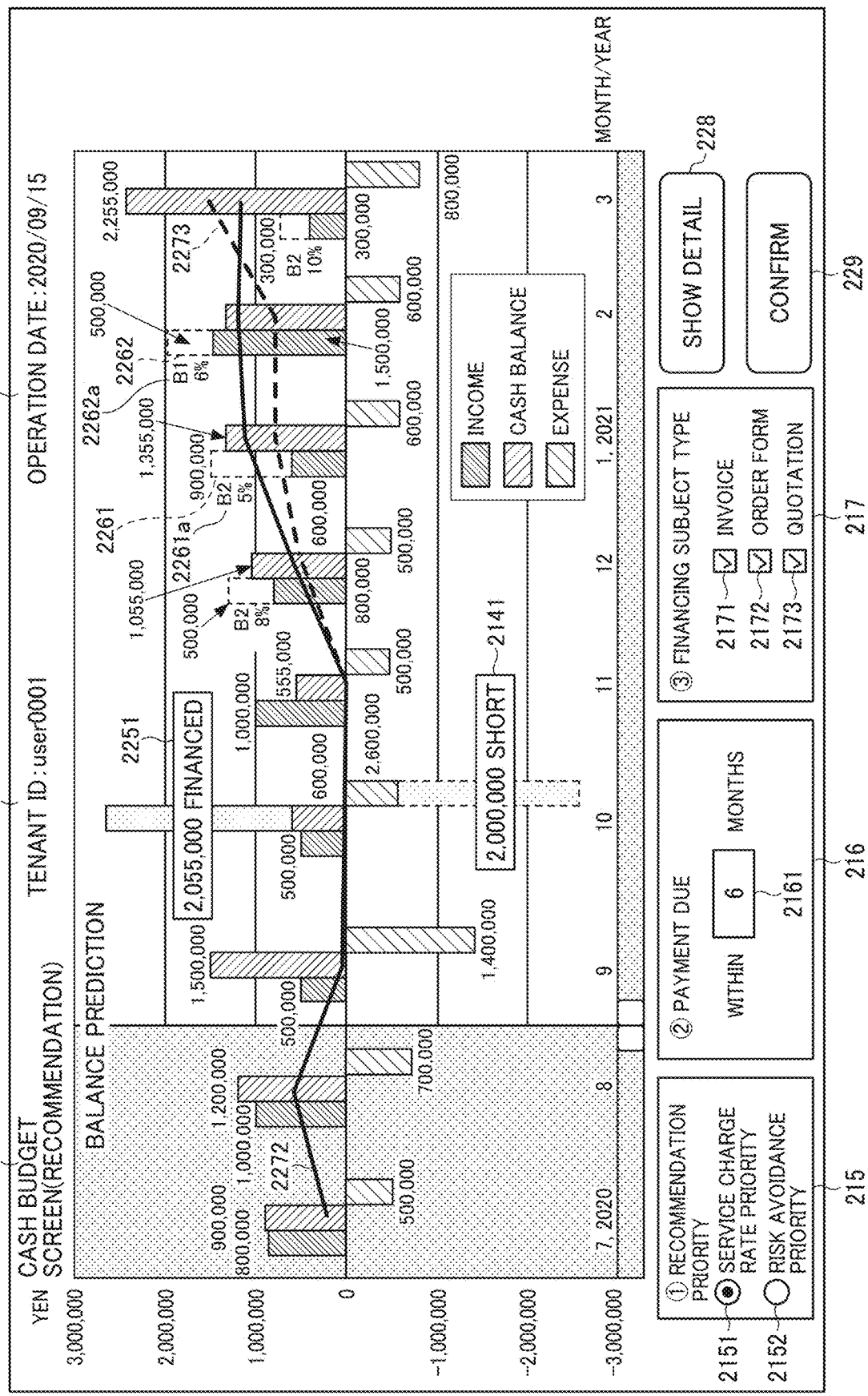
FIG. 29 is an illustration of a display example of the cash budget screen, which reflects the changed recommendation information in the case of selecting the service charge rate priority.

FIG. 29 is an illustration of a display example of the cash budget screen, which reflects the recommendation information changed by the user A1 in the case of selecting the service charge rate priority. As illustrated in FIG. 29, the cash budget screen 221, which reflects update after the check status of the check box is changed on the recommendation screen 252, newly includes a line graph 2273 indicating "difference between cash balance and expense" of the specific period recalculated based on the recommendation information selected by the user A1, compared with the cash budget screen 220 of FIG. 25. Further, the message 2251 indicating the amount of funds is updated to display the amount of funds recalculated based on the recommendation information selected by the user A1.

The line graph 2273 is displayed so as to have appearance different from that of the line graph 2272. As described above, the line graph 2272 indicates "the difference between the cash balance and the expense" in the specific period, which is calculated based on the financing subject proposed by the proposal server 3. For example, if the line graph 2272 is displayed in solid line, the line graph 2273 may be displayed in dotted line, broken line, or alternating of long and short dash line, which can be visually recognized as being different from the solid line. Further, the line graph 2272 and the line graph 2273 may be displayed in different line colors. For example, if the line graph 2272 is displayed in black line, the line graph 2273 may be displayed in different line color such as red, blue, or green, which can be visually recognized as being different from black.

The cash budget screen 221 illustrated in FIG. 29 displays a line graph 2272 indicating the "difference between the cash balance and the expense" in the specific period based on the financing subject proposed by the proposal server 3, and a line graph 2273 indicating the "difference between the cash balance and the expense" in the specific period based on the recommendation information selected by the user A1, in a manner that can be distinguished from each other. Therefore, the user A1 can easily compare financing in the case where the financing subject is changed, and can appropriately determine the financing subject.

As described above, according to the present embodiment, the proposal server 3 visualizes predicted state of future financing when financing is received for the proposed form, allowing the user to easily recognize the predicted state of future financing.

Further, the proposal server 3 transmits, to the user terminal 1, recommendation on a specific financing source (or form) that satisfies a predetermined condition requested by the user A1 (service user company A). That is, the proposal server 3 transmits, to the user terminal 1, a proposal for a specific financing source ("where" to apply) that the user A (service user company A) can apply. With this proposal, the user A1 is able to easily find a financing source (or form) that meets the condition desired by the user A1 (service user company A).

In addition, the proposal server 3 transmits, to the user terminal 1, information indicating a specific form determined based on the predetermined condition, from among a plurality of forms issued by the user A1 in providing products or services. That is, the proposal server 3 transmits, to the user terminal 1, recommendation on a specific financing subject ("what" to apply) to be used for requesting the specific financing source for financing, which satisfies a predetermined condition requested by the user A1 (service user company A). With this proposal, the user A1 is able to easily find a financing source (or form) that meets the condition desired by the user A1 (service user company A).

After the step S49 in FIG. 20, the proposal server 3 may perform S4 of FIG. 3 to apply for financing on behalf of the user A1.

The user terminal 1 is an example of a communication terminal. Examples of the user terminal 1 include, in addition to the PC, a smart watch, a game machine, and a video conference system.

Some hardware elements, such as the CPU 101, may be single or plural.

Each of the functions of the above-described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), System on a chip (SOC), graphical processing unit (GPU), and conventional circuit components arranged to perform the recited functions.

The servers 3, 5, and 7 described in the embodiment are merely one example of plural computing environments that implement one or more embodiments disclosed herein. For example, the proposal server 3 may include a plurality of computing devices such as a server cluster. The plurality of computing devices are configured to communicate with one another through any type of communication link, including a communication network, a shared memory, etc., and perform processes disclosed herein. In substantially the same manner, the proposal server 3 can include a plurality of computing devices configured to communicate with one another.

Further, the proposal server 3 can be configured to share the disclosed processes with any server in various combinations. For example, a part of processes to be executed by the proposal server 3 can be executed by any other server. Similarly, a part of functions to be executed by the proposal server 3 can be performed by any other server. Further, the elements of the proposal server 3 and any other server may be combined into one apparatus or may be divided into a plurality of apparatuses.

Furthermore, in communication between each terminal and each server, any intermediary device such as another server or a router may be disposed to relay data.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

In one aspect, a proposal server is provided, which proposes information, via a communication network, to a user terminal of a user who provides or is to provide a product or a service to a business partner of the user. The proposal server includes: a receiver configured to receive condition information indicating a predetermined condition related to financing using a form issued by the user in providing the product or the service, the condition information being transmitted from the user terminal; and a transmitter configured to transmit data of a financing projection screen based on information of a particular form that meets the predetermined condition, the financing projection screen indicating future finance.

In another aspect, a server includes circuitry that receives, from a user terminal of a user, condition information indicating a condition for determining a financing service to be provided to the user. The server selects, from among a plurality of forms each issued by the user in providing a product or a service to a business partner, one or more particular forms that meet the condition for determining a financing service. The server transmits financial projection screen data to the user terminal, the financial projection screen data indicating financial projection of the user based on information on the particular forms.

In another aspect, the information on the particular forms includes, for each particular form, a billing amount billed to the business partner and a payment due of the billing amount on the particular form.

In another aspect, the circuitry calculates a cash balance for each of specific time periods based on the billing amount and the payment due on the particular form, and generates the financial projection screen data including the cash balance that is calculated for each of the specific time periods.

In another aspect, the particular forms each have a payment due that falls within a time period determined by the condition information. The circuitry calculates, using the information on the particular forms, a difference between the cash balance and expense for each of specific time period, for the time period determined by the condition information, and generates the screen data including the difference between the cash balance and the expense.

In another aspect, the circuitry receives a selection of one or more other forms different than the particular forms, the one or more other forms meeting the condition for determining a financing service. The circuitry calculates, using the information on the other forms, a difference between the cash balance and expense for each of specific time period, for the time period determined by the condition information, and transmits updated screen data to the user terminal, the updated screen data including the difference that is calculated based on the information on the other forms.

In another aspect, the condition information selects one of: a first condition in which the particular forms are selected so as to minimize a service charge rate in financing; and a second condition in which the particular forms are selected so as to select the forms billed to a particular business partner with low credibility.

In another aspect, the form includes at least one of an invoice, order form, or quotation.

The invention claimed is:

1. A server for providing information to a user terminal via a network, the server comprising circuitry configured to:
receive, from the user terminal, condition information for determining a financing service to be provided, the condition information being received from the user terminal in response to acceptance of a selection of one or more buttons corresponding respectively to at least an invoice, a purchase order, and a quotation, the buttons being displayed on a screen of the user terminal and indicating types of form subject to financing;
obtain one or more financing subject types based on the condition information that has been received, for each of the one or more selected form types;
select one or more financing source candidates that match the condition information that has been received, using the financing subject type, from among a plurality of financing source candidates available to the user, the selecting comprising:
determining whether a business type is applicable to a financing determination; and
determining, when it is determined that the business type is applicable to the financing determination, a financing source candidate corresponding to the business type; and
transmit, to the user terminal, information indicating the selected financing source candidates.

2. The server according to claim 1, wherein:
the business type is a tenant.

3. The server according to claim 1, wherein the circuitry is further configured to:
specify a financing service type corresponding to a financing subject type indicated by the condition information.

4. The server according to claim 1, wherein the circuitry is further configured to:
determine whether a business type is a private business type; and
determine, when it is determined that the business type is the private business type, a financing source candidate corresponding to the business type.

5. The server according to claim 1, wherein the circuitry is further configured to:
specify a financing service type which corresponds to the financing subject type; and
determine, as a financing source candidate, a financing service corresponding to a business type from financing sources corresponding to the financing service type that has been specified.

6. The server according to claim 1, wherein:
the condition information that has been received is a service charge rate priority that prioritizes a financing source candidate having a low service charge rate.

7. The server according to claim 1, wherein:
the condition information that has been received is a risk avoidance priority that prioritizes minimizing risk based on a credibility of a business partner associated with the form subject to financing.

8. A method for providing information to a user terminal via a network, comprising:
receiving, from the user terminal, condition information for determining a financing service to be provided, the condition information being received from the user terminal in response to acceptance of a selection of one or more buttons corresponding respectively to at least an invoice, a purchase order, and a quotation, the buttons being displayed on a screen of the user terminal and indicating types of form subject to financing;
obtaining one or more financing subject types based on the condition information that has been received, for each of the one or more selected form types;
selecting one or more financing source candidates that match the condition information that has been received, using the financing subject type, from among a plurality of financing source candidates available to the user, the selecting comprising:

determining whether a business type is applicable to a financing determination; and determining, when it is determined that the business type is applicable to the financing determination, a financing source candidate corresponding to the business type; and transmitting, to the user terminal, information indicating the selected financing source candidates.

9. The method according to claim 8, wherein:

the business type is a tenant.

10. The method according to claim 8, further comprising:

specifying a financing service type corresponding to a financing subject type indicated by the condition information.

11. The method according to claim 8, further comprising:

determining whether a business type is a private business type; and determining, when it is determined that the business type is the private business type, a financing source candidate corresponding to the business type.

12. The method according to claim 8, further comprising:

specifying a financing service type which corresponds to the financing subject type; and determining, as a financing source candidate, a financing service corresponding to a business type from financing sources corresponding to the financing service type that has been specified.

13. The method according to claim 8, wherein:

the condition information that has been received is a service charge rate priority that prioritizes a financing source candidate having a low service charge rate.

14. The method according to claim 8, wherein:

the condition information that has been received is a risk avoidance priority that prioritizes minimizing risk based on a credibility of a business partner associated with the form subject to financing.

15. A system, comprising:

a server; and a user terminal connected to the server via a network, the user terminal comprising circuitry configured to:

transmit condition information for determining a financing service to be provided, the server comprising circuitry configured to:

receive, from the user terminal, the condition information for determining the financing service to be provided, the condition information being received from the user terminal in response to acceptance of a selection of one or more buttons corresponding respectively to at least an invoice, a purchase order, and a quotation, the buttons being displayed on a screen of the user terminal and indicating types of form subject to financing;

obtain one or more financing subject types based on the condition information that has been received, for each of the one or more selected form types;

select one or more financing source candidates that match the condition information that has been received, using the financing subject type, from among a plurality of financing source candidates available to the user, the selecting comprising:

determining whether a business type is applicable to a financing determination; and determining, when it is determined that the business type is applicable to the financing determination, a financing source candidate corresponding to the business type; and transmit, to the user terminal, information indicating the selected financing source candidates.

16. The system according to claim 15, wherein:

the business type is a tenant.

17. The system according to claim 15, wherein the circuitry of the server is further configured to:

specify a financing service type corresponding to a financing subject type indicated by the condition information.

18. The system according to claim 15, wherein the circuitry of the server is further configured to:

specify a financing service type which corresponds to the financing subject type; and determine, as a financing source candidate, a financing service corresponding to a business type from financing sources corresponding to the financing service type that has been specified.

19. The system according to claim 15, wherein:

the condition information that has been received is a service charge rate priority that prioritizes a financing source candidate having a low service charge rate.

20. The system according to claim 15, wherein:

the condition information that has been received is a risk avoidance priority that prioritizes minimizing risk based on a credibility of a business partner associated with the form subject to financing.

* * * * *